(12) United States Patent
Yoneda et al.

(10) Patent No.: US 9,401,969 B2
(45) Date of Patent: Jul. 26, 2016

(54) INFORMATION PROCESSING SYSTEM, INFORMATION PROCESSING APPARATUS, AND ADMINISTRATION SERVER

(75) Inventors: Yoshihiro Yoneda, Tokyo (JP); Naoki Miyabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 370 days.

(21) Appl. No.: 13/065,215

(22) Filed: Mar. 16, 2011

(65) Prior Publication Data
US 2011/0237187 A1    Sep. 29, 2011

(30) Foreign Application Priority Data
Mar. 24, 2010   (JP) ................ P2010-068271

(51) Int. Cl.
*H04B 5/00*    (2006.01)
*H04L 29/08*    (2006.01)
(52) U.S. Cl.
CPC .............. *H04L 67/303* (2013.01); *H04L 67/14* (2013.01); *H04L 67/34* (2013.01)
(58) Field of Classification Search
USPC ............................ 455/41.1, 41.2, 41.3, 553.1
See application file for complete search history.

(56) References Cited

U.S. PATENT DOCUMENTS

| | | | | |
|---|---|---|---|---|
| 7,583,685 B2 * | 9/2009 | Ajitomi | ............... | H04L 12/2803 370/401 |
| 2004/0078343 A1 * | 4/2004 | Morita | ................ | G06F 21/6245 705/80 |
| 2004/0259499 A1 | 12/2004 | Oba et al. | | |
| 2005/0152376 A1 * | 7/2005 | Itoh | ........................ | H04W 8/005 370/400 |
| 2006/0253556 A1 * | 11/2006 | Wallis | ................. | H04L 41/0273 709/220 |
| 2010/0069008 A1 * | 3/2010 | Oshima | ................... | H04W 4/02 455/41.3 |

FOREIGN PATENT DOCUMENTS

| | | |
|---|---|---|
| CA | 2571255 A1 | 6/2007 |
| EP | 1492302 A2 | 12/2004 |
| EP | 1551151 A2 | 7/2005 |
| JP | 2003-032176 A | 1/2003 |

OTHER PUBLICATIONS

European Search Report EP 11158662, dated Jun. 30, 2011.

* cited by examiner

*Primary Examiner* — Edward Urban
*Assistant Examiner* — Ralph H Justus
(74) *Attorney, Agent, or Firm* — Chip Law Group

(57) ABSTRACT

A system and method for information processing is provided. In an embodiment of the present system and method, a connection target apparatus is detected at an information processing apparatus. Upon detection, the information processing apparatus generates apparatus information and transmits the apparatus information to a server via a communication path. Based on the apparatus information, the server generates connection information and transmits the connection information to the information processing apparatus. The information processing apparatus may use the connection information to establish communication with the connection target apparatus via another communication path.

15 Claims, 20 Drawing Sheets

```
address=51-34-84-11-12-34
protocol= IEEE 802.15.1
ver=2.1
option=PROFILE_SPP
os=xxxx SP3
```

FIG. 7

| Vendor ID | APPA-RATUS TYPE ID | Serial ID | | URL | Parameter | |
|---|---|---|---|---|---|---|
| | | Min | Max | | manufacturer | product |
| 01-23-45 | 00 | 00-00 | 1F-FF | http://hoge.com/products/stho | hoge | PD100 |
| 01-23-45 | 10 | 20-00 | 2F-FF | http://hoge.com/products/stho | hoge | WG100 |
| 51-34-84 | 11 | 10-00 | 1F-FF | http://foo.co.jp/products | foo | BP9000 |
| 51-34-84 | 12 | 20-00 | 4F-FF | http://foo.co.jp/products | foo | TH10 |

A: Vendor ID, APPARATUS TYPE ID, Serial ID
B: URL
C: Parameter
SEL: selected row (51-34-84, 11)

FIG. 8 http://foo.co.jp/products?manufacturer=foo,product=BP9000,
download_url=http://bar.com/download/,protocol= IEEE 802.15.1,
ver=2.1,option=PROFILE-SPP,os=xxxx-SP3

FIG. 9 http://bar.com/download?manufacturer=foo,product=BP9000,protocol=
IEEE 802.15.1,ver=2.1,option=PROFILE-SPP,os=xxxx-SP3

INFORMATION PROCESSING SYSTEM, INFORMATION PROCESSING APPARATUS, AND ADMINISTRATION SERVER

CROSS-REFERENCE TO RELATED APPLICATION

The present application claims priority from Japanese Patent Application No. JP 2010-068271 filed in the Japanese Patent Office on Mar. 24, 2010, the entire content of which is incorporated herein by reference.

BACKGROUND OF THE INVENTION

1. Field of the Invention

The present invention relates to an information processing system, an information processing apparatus, and an administration server.

2. Description of the Related Art

Recently, information processing apparatuses such as portable telephones achieve more and more functions. Information processing apparatuses capable of communicating by means of a plurality of communication methods, such as a communication using NFC (Near Field Communication) and a communication using IEEE 802.15.1 (which may also be referred to as "Bluetooth" (registered trademark), which may be hereinafter abbreviated as "BT"), have come on the market.

In such circumstances, a technique has been developed to perform communications upon switching a plurality of communication methods. For example, the specification of Japanese Patent No. 3671881 discloses a technique for selectively switching a plurality of different communication methods to identify a communication target apparatus with which communication is to be performed and communicating with the identified apparatus.

SUMMARY OF THE INVENTION

An information processing apparatus (which may be hereinafter simply referred to as "conventional information processing apparatus") applied with the conventional technique for performing communications upon switching a plurality of communication methods (hereinafter simply referred to as "conventional technique") identifies, by means of communication using NFC, a communication target apparatus with which communication is to be performed by means of IEEE 802.15.1, and communicates with the identified apparatus by means of IEEE 802.15.1. Therefore, with the conventional technique, a user of the conventional information processing apparatus can start communication with the communication target apparatus by means of IEEE 802.15.1 by bringing the information processing apparatus into proximity to the communication target apparatus (i.e., the distance between the information processing apparatus and the communication target apparatus is no more than a communication range of NFC (this is also applicable in the following explanation).). Therefore, the conventional technique may improve the convenience of the user.

However, with the conventional technique, the user cannot start communication between the conventional information processing apparatus and the communication target apparatus by means of IEEE 802.15.1 unless the user brings the conventional information processing apparatus and the communication target apparatus into proximity to each other. Therefore, there is a possibility that the convenience of the user may be reduced even with the conventional technique.

More specifically, the communication range achieved by means of NFC is about several dozen [cm]. Therefore, even with the conventional technique, the user cannot start communication by means of IEEE 802.15.1 unless the distance between the conventional information processing apparatus and the communication target apparatus is several dozen [cm] or less. In this case, when the conventional information processing apparatus and/or the communication target apparatus are portable apparatuses (so-called mobile apparatuses) such as portable telephones, the burden imposed on the user is not so large. However, when both of the conventional information processing apparatus and the communication target apparatus are not the mobile apparatuses such as portable telephones, the user cannot start communication by means of IEEE 802.15.1 unless the conventional information processing apparatus and the communication target apparatus, which are not mobile apparatuses, are brought into proximity to each other.

Therefore, the conventional technique does not necessarily improve the convenience of the user when the user starts communication between an information processing apparatus and a connection target apparatus with which communication is to be performed.

In view of the foregoing, it is desirable to provide a novel and improved information processing system, information processing apparatus, and administration server, wherein the convenience of the user can be improved when the user starts communication between the information processing apparatus and the connection target apparatus with which communication is to be performed.

Accordingly, the present system and method is provided. In an embodiment of the present system and method, a connection target apparatus is detected at an information processing apparatus. Upon detection, the information processing apparatus generates apparatus information and transmits the apparatus information to a server via a communication path. Based on the apparatus information, the server generates connection information and transmits the connection information to the information processing apparatus. The information processing apparatus may use the connection information to establish communication with the connection target apparatus via another communication path.

BRIEF DESCRIPTION OF THE DRAWINGS

FIG. 7 is an explanatory diagram illustrating an example of administration information according to the embodiment of the present invention;

FIG. 8 is an explanatory diagram illustrating an example of generation control information generated by the administration server according to the embodiment of the present invention;

FIG. 9 is an explanatory diagram illustrating an example of a connection information transmission request transmitted by a relay server according to the embodiment of the present invention;

DETAILED DESCRIPTION OF THE EMBODIMENT

Figure 1:
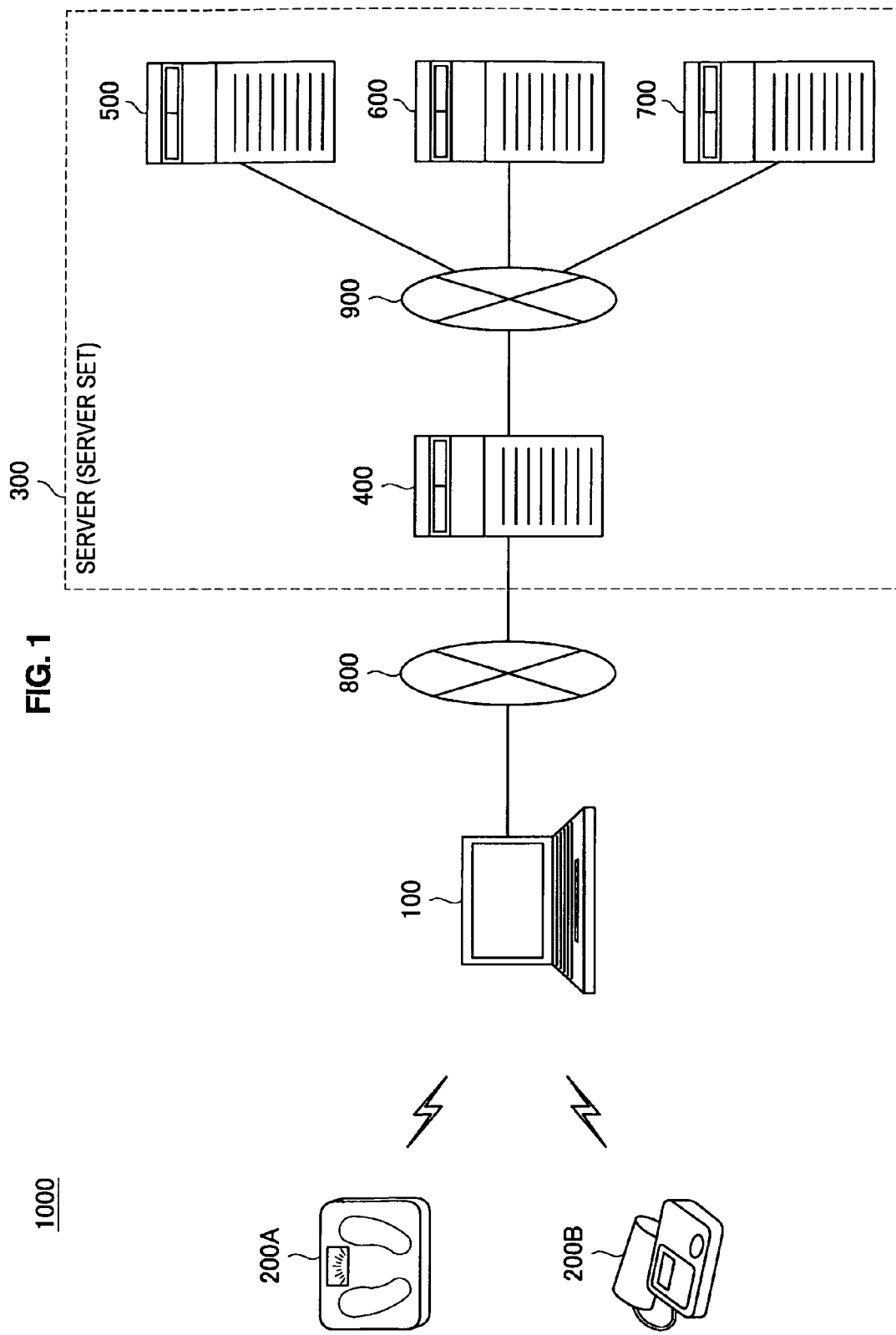
FIG. 1 is an explanatory diagram illustrating an example of a configuration of an information processing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The below explanation will be made in the order listed below.

1. Approach relating to an embodiment of the present invention

2. Information processing system according to an embodiment of the present invention 3. Program according to an embodiment of the present invention (Approach According to the Embodiment of the Present Invention)

First, a convenience improving approach according to the embodiment of the present invention will be explained before explaining configurations of apparatuses constituting an information processing system according to the embodiment of the present invention (which may be hereinafter referred to as "information processing system 1000").

[Overview of Convenience Improving Approach]

As described above, with the conventional technique, a user cannot start communication between a conventional information processing apparatus and a communication target apparatus by means of IEEE 802.15.1 unless the user brings the conventional information processing apparatus and the communication target apparatus into proximity to each other. Therefore, the conventional technique may reduce the convenience of the user.

Accordingly, in an embodiment of the present invention, a user starts communication between an information processing apparatus according to the embodiment of the present invention (which may be hereinafter referred to as "information processing apparatus 100") and one or more communication target apparatuses (which may be hereinafter collectively referred to as "connection target apparatus 200"), with which the information processing apparatus 100 communicates, without bringing the information processing apparatus 100 and the connection target apparatus 200 into proximity to each other.

More specifically, in the embodiment of the present invention, the information processing apparatus 100 communicates with a server according to the embodiment of the present invention (which may be hereinafter referred to as "server 300") via a second communication path, which is different from a first communication path, in order to perform communication between the information processing apparatus 100 and the connection target apparatus 200 via the first communication path.

In this case, the first communication path according to the embodiment of the present invention is a communication path formed by a communication method using a predetermined connection setting in order for the information processing apparatus 100 to communicate with the connection target apparatus 200 in a one-to-one manner. Examples of the first communication path according to the embodiment of the present invention include a wireless communication using IEEE 802.15.1 and a wireless communication using a wireless LAN such as IEEE 802.11b (which may be hereinafter referred to as "Wi-Fi").

On the other hand, the second communication path according to the embodiment of the present invention is a communication path formed by a communication method in which the information processing apparatus 100 can communicate with the server 300 via a network. Examples of networks according to the embodiment of the present invention include wired networks such as LAN (Local Area Network) and WAN (Wide Area Network), wireless networks such as wireless WAN (WWAN; Wireless Wide Area Network) and wireless MAN (WMAN; Wireless Metropolitan Area Network) via base stations, or the Internet using a communication protocol such as TCP/IP (Transmission Control Protocol/Internet Protocol).

The server 300 generates connection information corresponding to the connection target apparatus 200 with which the information processing apparatus 100 wants to communicate via the first communication path, based on a communication with the information processing apparatus 100, and transmits the generated connection information to the information processing apparatus 100. In this case, the connection information according to the embodiment of the present invention is information (data) used by the information processing apparatus 100 to start communication with the connection target apparatus 200 via the first communication path. Specific examples of connection information according to the embodiment of the present invention will be explained later.

Then, the information processing apparatus 100 uses the connection information transmitted from the server 300 to start communication with the connection target apparatus 200 corresponding to the connection information via the first communication path.

As described above, in the embodiment of the present invention, the user does not have to bring the information processing apparatus 100 and the connection target apparatus 200 into proximity to each other, as in the conventional technique, in order to start communication between the information processing apparatus 100 and the connection target apparatus 200 via the first communication path. Therefore, in the embodiment of the present invention, the convenience of the user can be improved when the user starts communication between the information processing apparatus 100 and the connection target apparatus 200 with which communication is to be performed.

[Processing Relating to Convenience Improving Approach]

Subsequently, the processing relating to the convenience improving approach according to the embodiment of the present invention in the information processing system 1000 will be specifically explained.

[Overview of Information Processing System 1000]

First, an overview of the information processing system 1000 will be explained before explaining the processing relating to the convenience improving approach in the information processing system 1000.

FIG. 1 is an explanatory diagram illustrating an example of a configuration of the information processing system 1000 according to the embodiment of the present invention. The information processing system 1000 includes the information processing apparatus 100, communication target apparatuses 200A, 200B (hereinafter collectively referred to as "connection target apparatus 200"), and the server 300. The information processing apparatus 100 and the communication target apparatus 200 are connected via a wireless communication serving as the first communication path. Further, the information processing apparatus 100 and the server 300 are connected via a network 800 serving as the second communication path. Herein, the "connection" according to the embodiment of the present invention means being in a state in which communication can be performed (or, caused to be in a state in which communication can be performed).

Herein, FIG. 1 shows one information processing apparatus 100. However, the number of information processing apparatuses 100 constituting the information processing system 1000 according to the embodiment of the present invention is not limited to the example shown in FIG. 1. For example, the information processing system 1000 according to the embodiment of the present invention may include a plurality of information processing apparatuses 100, and each of the information processing apparatuses 100 may perform the later-explained processing relating to the convenience improving approach, whereby each of the information processing apparatuses 100 can communicate with the connection target apparatus 200 via the first communication path. FIG. 1 shows two connection target apparatuses 200 serving as candidates for communication target apparatuses with which the information processing apparatus 100 can communicate via the first communication path. However, the number of connection target apparatuses 200 is not limited to the example shown in FIG. 1. For example, the information processing system 1000 according to the embodiment of the present invention may include one or more connection target apparatuses 200.

For example, in FIG. 1, the server 300 is a server set including a relay server 400, an administration server 500, a connection information generation server 600, and a data storage server 700. However, the configuration of the server 300 according to the embodiment of the present invention is not limited to the example shown in FIG. 1. For example, the server 300 according to the embodiment of the present invention may be constituted by one apparatus. Alternatively, the server 300 according to the embodiment of the present invention may not include the relay server 400 and/or the data storage server 700. Even when the server 300 according to the embodiment of the present invention does not include the relay server 400 and/or the data storage server 700, the information processing system 1000 according to the embodiment of the present invention achieves the above-explained convenience improving approach according to the embodiment of the present invention, and improves the convenience of the user. FIG. 1 shows one connection information generation server 600 and one data storage server 700. However, the server 300 according to the embodiment of the present invention may include a plurality of connection information generation servers 600 and a plurality of data storage servers 700. FIG. 1 shows an example where each apparatus serving as the server 300 is connected via the network 900. The network 900 may be the same type of network as the network 800, or may be a different type of network.

Each of the information processing apparatus 100, the communication target apparatus 200, the relay server 400, the administration server 500, the connection information generation server 600, and the data storage server 700 as shown in FIG. 1 is not limited to the application to the apparatuses as shown in FIG. 1.

[1] Overview of Information Processing Apparatus 100

The information processing apparatus 100 obtains connection information from the server 300 via the second communication path and communicates with one or more connection target apparatuses 200 corresponding to the connection information via the first communication path based on the connection information.

More specifically, the information processing apparatus 100 detects the connection target apparatus 200 with which communication is to be performed via the first communication path, and the information processing apparatus 100 generates apparatus information (which will be explained later) representing the detected connection target apparatus. Herein, for example, the information processing apparatus 100 transmits a detection signal for detecting the connection target apparatus 200, and detects the connection target apparatus 200 with which communication is to be performed, based on a response signal transmitted from the connection target apparatus 200 having received the detection signal. The above transmission/reception of the detection signal and the above transmission/reception of the response signal are considered to be communications between the information processing apparatus 100 and the connection target apparatus 200 with which communication is to be performed. However, the above transmission/reception of the detection signal and the above transmission/reception of the response signal are not communications between the information processing apparatus 100 and the particular connection target apparatus 200 which is identified as the target of communication. Therefore, in the embodiment of the present invention, the communication with the connection target apparatus 200 via the first communication path based on the connection information can be distinguished from the communication relating to the above transmission/reception of the detection signal and the above transmission/reception of the response signal. For example, the communication relating to the above transmission/reception of the detection signal may be a near field communication (NFC) conducted over a NFC path, and the communication relating to the above transmission/reception of the response signal may be a NFC conducted over a NFC path. The information processing apparatus 100 may transmit a NFC signal for detecting the connection target apparatus 200, and the connection target apparatus 200 may transmit a NFC signal in response to the NFC signal transmitted by the information processing apparatus 100.

Further, the information processing apparatus 100 transmits the generated apparatus information to the server 300 via the second communication path, and obtains the connection information generated based on the apparatus information from the server 300. In other words, the apparatus information according to the embodiment of the present invention generated by the information processing apparatus 100 is information (data) with which the server 300 generates the connection information. Then, the information processing apparatus 100 communicates with the connection target apparatus 200 corresponding to the connection information via the first communication path based on the connection information obtained from the server 300.

Further, when the information processing apparatus 100 does not have sufficient processing data used for communicating with the connection target apparatus 200 corresponding to the connection information via the first communication path when the information processing apparatus 100 communicates with the connection target apparatus 200, the information processing apparatus 100 transmits, to the server 300, a data transmission request for requesting the processing data. Then, the information processing apparatus 100 uses the processing data transmitted from the server 300 according to the data transmission request to start communication with the connection target apparatus 200 corresponding to the connection information via the first communication path.

[2] Overview of Connection Target Apparatus 200

The connection target apparatus 200 is an apparatus for communicating with the information processing apparatus 100 via the first communication path. The connection target apparatus 200 stores information indicating the connection target apparatus 200, and when the connection target apparatus 200 receives the detection signal from the information processing apparatus 100, the connection target apparatus 200 transmits the response signal including the information indicating the connection target apparatus 200. Further, the connection target apparatus 200 communicates with the information processing apparatus 100 via the first communication path when the information processing apparatus 100 starts communication via the first communication path based on the connection information. Herein, the connection target apparatus 200 is constituted by any hardware capable of communicating with the information processing apparatus 100 via the first communication path.

[3] Overview of Server 300

The server 300 stores information for generating the connection information for each connection target apparatuses 200. Herein, examples of information for generating the connection information according to the embodiment of the present invention include information representing a vendor of the connection target apparatus 200, information representing an apparatus type of the connection target apparatus 200, and device information possessed by the connection target apparatus 200 for communication via the first communication path.

The server 300 identifies information, for generating the connection information, corresponding to the connection target apparatus 200 indicated by the apparatus information, based on the apparatus information transmitted from the information processing apparatus 100, and generates the connection information based on the identified information for generating the connection information. Then, the server 300 transmits the generated connection information to the information processing apparatus 100.

On the other hand, when the server 300 receives the data transmission request from the information processing apparatus 100, the server 300 transmits processing data according to the data transmission request to the information processing apparatus 100.

For example, the server 300 performs the above processing, thereby starting communication via the first communication path between the information processing apparatus 100 and the connection target apparatus 200 with which communication is to be performed. Herein, for example, the server 300 may be achieved with one server (apparatus). Alternatively, as shown in FIG. 1, the server 300 may be a server set including a plurality of servers. An overview of processing performed by each server will be hereinafter explained in a case where the server 300 is the server set as shown in FIG. 1.

[3-1] Overview of Relay Server 400

The relay server 400 serves as a relay apparatus for relaying communication between the information processing apparatus 100 and another server (the administration server 500, the connection information generation server 600, and the data storage server 700). Since the server 300 has the relay server 400, the user of the information processing apparatus 100 (which may be hereinafter simply referred to as "user") can obtain the connection information from the server 300 when the information processing apparatus 100 is connected to the relay server 400. In other words, the user can start communication between the information processing apparatus 100 and the connection target apparatus 200 via the first communication path by causing the information processing apparatus 100 to connect to the relay server 400 serving as a so-called portal site. Therefore, even when the server 300 is the server set as shown in FIG. 1, the relay server 400 allows the user to perceive the server 300 exactly as if the server 300 is constituted by one server. Therefore, in a case where the server 300 is constituted by the server set, the convenience of the user is not reduced when the server 300 has the relay server 400.

Further, the relay server 400 serves as a so-called portal site. Therefore, for example, the relay server 400 can also serve as a service providing server for providing services to users.

When the server 300 according to the embodiment of the present invention is constituted by the server set, the configuration is not limited to the configuration including the relay server 400. For example, the server 300 according to the embodiment of the present invention may not include the relay server 400. Even with the above configuration, the server 300 according to the embodiment of the present invention can identify the information for generating the connection information based on the apparatus information transmitted from the information processing apparatus 100, and can generate the connection information based on the identified information for generating the connection information. Therefore, even when the server 300 according to the embodiment of the present invention has the above configuration, the information processing system 1000 achieves the convenience improving approach according to the embodiment of the present invention, thus improving the convenience of the user.

[3-2] Administration Server 500

The administration server 500 causes either of one or more connection information generation servers 600 constituting the server 300 to generate the connection information corresponding to the apparatus information transmitted from the information processing apparatus 100.

More specifically, the administration server 500 stores administration information (specific example of which will be explained later) including information for causing the connection information generation server 600 to generate the connection information. The administration server 500 identifies the connection information generation server 600 storing information for generating the connection information corresponding to the connection target apparatus 200 indicated by the apparatus information, based on the apparatus information transmitted from the information processing apparatus 100 and the administration information.

Further, the administration server 500 generates generation control information (specific example of which will be explained later) for causing the identified connection information generation server 600 to generate the connection information corresponding to the connection target apparatus 200 indicated by the apparatus information, based on the administration information and the apparatus information. Therefore, the administration information according to the embodiment of the present invention is considered to be information used by the administration server 500 to generate the generation control information.

Then, the administration server 500 transmits the generated generation control information to the identified connection information generation server 600 to cause the identified connection information generation server 600 to generate the connection information corresponding to the connection target apparatus 200 indicated by the apparatus information.

[3-3] Connection Information Generation Server 600

The connection information generation server 600 stores the information for generating the connection information for each connection target apparatus 200, and generates the connection information based on the information for generating the connection information stored therein. More specifically, the connection information generation server 600 generates the connection information based on the generation control information transmitted from the administration server 500 (or the connection information transmission request based on the generation control information transmitted from the relay server 400). Then, the connection information generation server 600 transmits the generated connection information (via the relay server 400 or directly) to the information processing apparatus 100.

[3-4] Data Storage Server 700

The data storage server 700 stores the processing data used by the information processing apparatus 100 to start communication via the first communication path. Herein, examples of processing data according to the embodiment of the present invention include application software (hereinafter simply referred to as "application") executed by the information processing apparatus 100 to start communication via the first communication path, and also include programs such as scripts.

When the data storage server 700 receives the data transmission request transmitted from the information processing apparatus 100, the data storage server 700 transmits, based on the data transmission request, the processing data corresponding to the data transmission request (via the relay server 400 or directly) to the information processing apparatus 100.

When the server 300 according to the embodiment of the present invention is constituted by the server set, the configuration is not limited to the configuration including the data storage server 700. For example, in a case where the information processing apparatus 100 constituting the information processing system 1000 is not configured to transmit the data transmission request, the server 300 according to the embodiment of the present invention may be configured not to include the data storage server 700. Even in this configuration, the server 300 according to the embodiment of the present invention can identify the information for generating the connection information based on the apparatus information transmitted from the information processing apparatus 100, and can generate the connection information based on the identified information for generating the connection information. Therefore, even when the server 300 according to the embodiment of the present invention is configured as described above, the information processing system 1000 achieves the convenience improving approach according to the embodiment of the present invention, and improves the convenience of the user.

The server 300 may not be constituted by one apparatus. For example, the server 300 may be the server set including the plurality of servers as described above. Even when the server 300 according to the embodiment of the present invention is the server set constituted by the plurality of servers as described above, the information processing system 1000 achieves the convenience improving approach according to the embodiment of the present invention and improves the convenience of the user. In the below explanation, an example is used where the server 300 is constituted by the server set as shown in FIG. 1, and the processing relating to the convenience improving approach according to the embodiment of the present invention will be explained.

The information processing system 1000 according to the embodiment of the present invention is constituted by the information processing apparatus 100, the connection target apparatus 200, and the server 300 as described above, and achieves the convenience improving approach according to the embodiment of the present invention. Subsequently, the information processing system 1000 as shown in FIG. 1 is used as an example to explain an example of the convenience improving approach according to the embodiment of the present invention in a more specific manner.

[Example of Processing Relating to Convenience Improving Approach]

Figure 2:
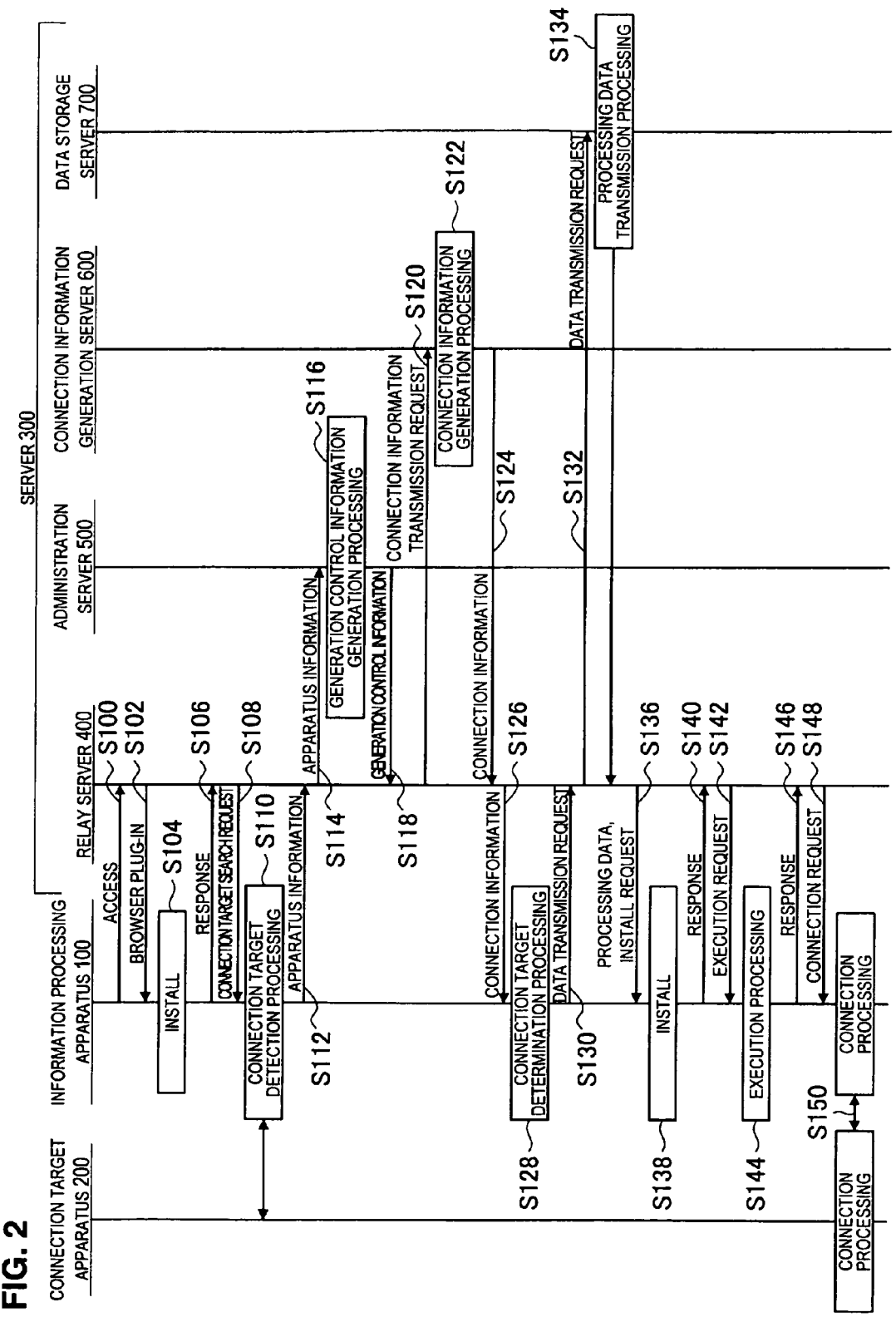
FIG. 2 is an explanatory diagram illustrating an example of processing relating to a convenience improving approach in the information processing system according to the embodiment of the present invention.

FIG. 2 is an explanatory diagram illustrating an example of processing relating to the convenience improving approach in the information processing system 1000 according to the embodiment of the present invention.

The information processing apparatus 100 accesses the relay server 400 (S100). Herein, an example of access in step S100 include a connection made by a user to a web site provided by the relay server 400 using a web browser executed by the information processing apparatus 100.

The relay server 400 accessed in step S100 transmits a browser plug-in corresponding to the information processing apparatus 100 (S102), and the information processing apparatus 100 installs the received browser plug-in (S104). Then, the information processing apparatus 100 transmits a response to the relay server 400 according to processing result when the installation is finished (S106).

Herein, the browser plug-in installed in step S104 is, for example, a program for causing the information processing apparatus 100 to perform processing according to a connection target detection request transmitted from the relay server 400 in step S106 explained later. When it is not necessary to install the browser plug-in in the information processing apparatus 100, the information processing system 1000 according to the embodiment of the present invention does not need to perform the processing of steps S102 to S106.

For example, when the relay server 400 receives, from the information processing apparatus 100, the response indicating a normal completion of processing in step S106, the relay server 400 transmits a connection target search request to the information processing apparatus 100 (S108). Although not shown in FIG. 2, when the response transmitted from the information processing apparatus 100 in step S106 indicates that the processing is not completed normally, the relay server 400 may perform the processing of step S102 again.

Figures 3, 4:
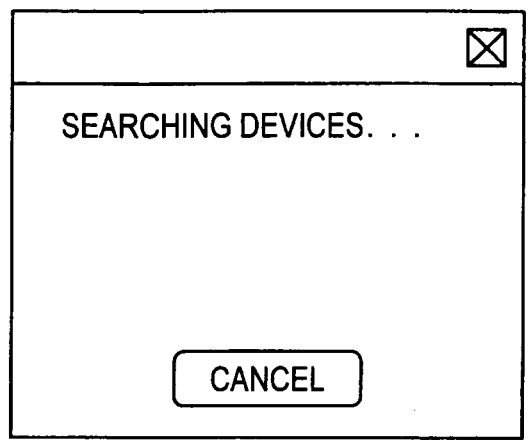
FIG. 3 is an explanatory diagram illustrating an example of a display screen displayed on an information processing apparatus according to the embodiment of the present invention.
FIG. 4 is an explanatory diagram illustrating an example of an apparatus information generated by the information processing apparatus according to the embodiment of the present invention.

The information processing apparatus 100 having received the connection target search request from the relay server 400 in step S108 performs detection processing of the connection target apparatus 200 with which communication is to be performed (S110; connection target detection processing). FIG. 3 is an explanatory diagram illustrating an example of a display screen displayed on the information processing apparatus 100 according to the embodiment of the present invention. FIG. 3 shows the example of the display screen displayed during execution of the connection target detection processing.

Herein, for example, the information processing apparatus 100 transmits the detection signal to detect the connection target apparatus 200, and detects the connection target apparatus 200 with which communication is to be performed, based on a response signal transmitted from the connection target apparatus 200 having received the detection signal. Then, the information processing apparatus 100 generates the apparatus information based on the received response signal (i.e., detection result).

FIG. 4 is an explanatory diagram illustrating an example of the apparatus information generated by the information processing apparatus 100 according to the embodiment of the present invention. For example, as shown in FIG. 4, the information processing apparatus 100 generates the apparatus information including, for example, address information of the detected connection target apparatus 200 and information about a protocol and a version of a communication device in the connection target apparatus 200. It is to be understood that the apparatus information according to the embodiment of the present invention is not limited to the example shown in FIG. 4.

FIG. 2 shows an example where the information processing apparatus 100 performs the detection processing of the connection target apparatus 200 based on the connection target search request transmitted from the relay server 400. However, the processing relating to the convenience improving approach according to the embodiment of the present invention is not limited to the example shown in FIG. 2. For example, the information processing apparatus 100 according to the embodiment of the present invention can perform the detection processing of the connection target apparatus 200 based on an operation signal according to user operation transmitted from the (later-explained) operation unit of the information processing apparatus 100 (alternatively, an external operation signal transmitted from an external operation device such as a remote controller (this is also applicable in the following explanation).).

The information processing apparatus 100 transmits the apparatus information generated in step S110 to the relay server 400 (S112). In a case where a plurality of connection target apparatuses 200 are detected in step S110, the information processing apparatus 100 transmits, for example, a plurality of pieces of apparatus information for each of the plurality of detected connection target apparatuses 200. However, the processing of step S112 is not limited to the above. For example, the information processing apparatus 100 may transmit, as one piece of apparatus information, pieces of apparatus information respectively corresponding to the plurality of detected connection target apparatuses 200.

The relay server 400 having received the apparatus information from the information processing apparatus 100 in step S112 transmits the received apparatus information to the administration server 500 (S114).

The administration server 500 having received the apparatus information from the relay server 400 in step S114 generates the generation control information based on the received apparatus information (S116).

[Example of Generation Control Information Generation Processing]

Figure 5:
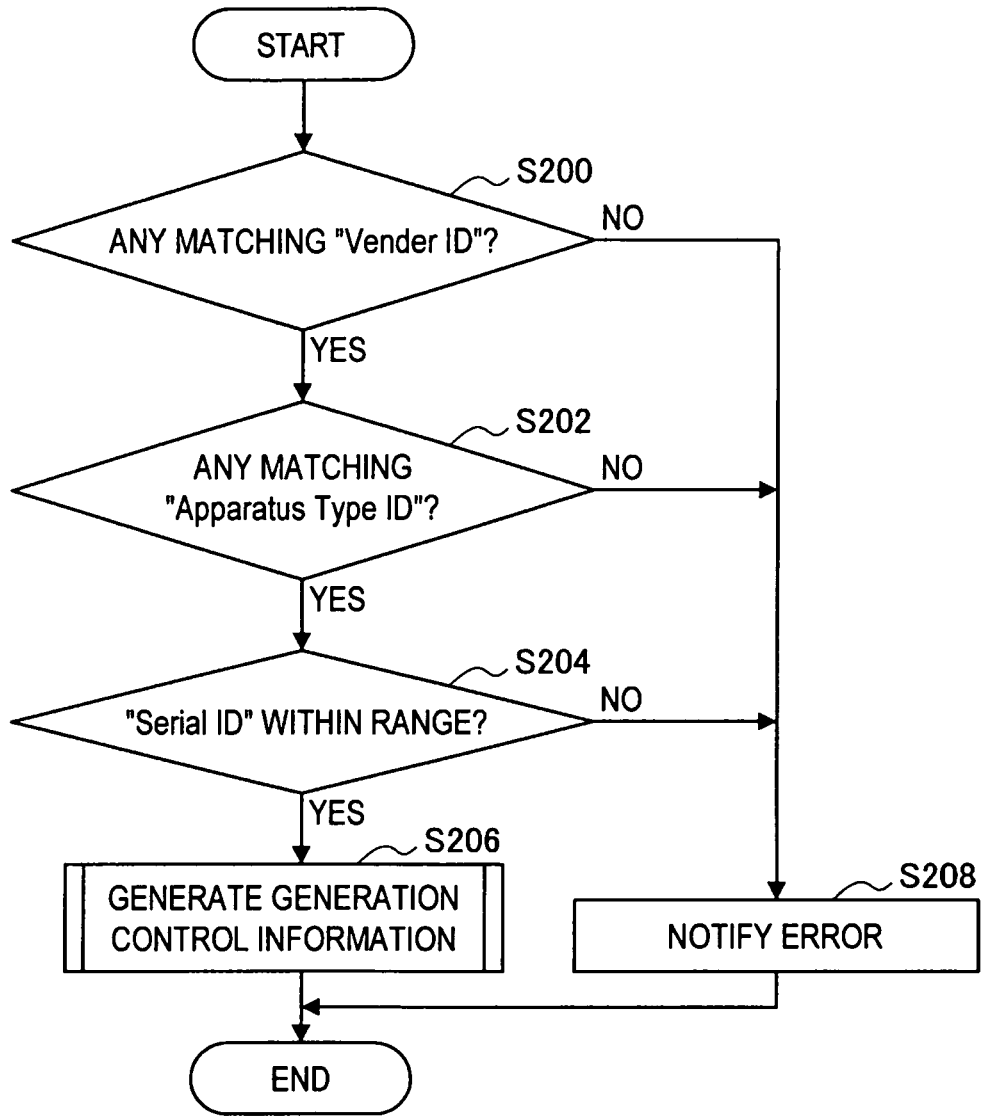
FIG. 5 is a flow diagram illustrating an example of generation control information generation processing performed by an administration server according to the embodiment of the present invention.
Figure 6:
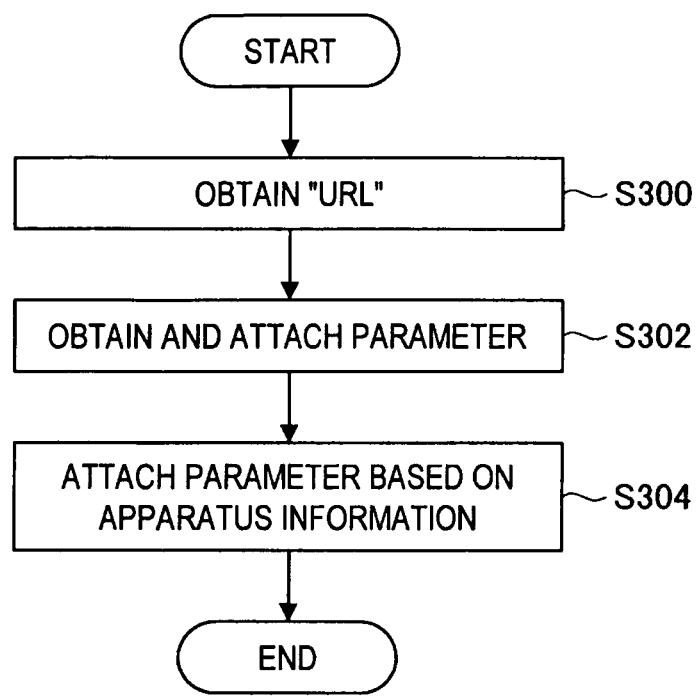
FIG. 6 is a flow diagram illustrating an example of generation control information generation processing performed by an administration server according to the embodiment of the present invention.

FIGS. 5 and 6 are flow diagrams illustrating an example of generation control information generation processing performed by the administration server 500 according to the embodiment of the present invention. Herein, FIG. 6 specifically shows the processing of step S206 as shown in FIG. 5.

FIG. 7 is an explanatory diagram illustrating an example of administration information according to the embodiment of the present invention. Examples of the administration information according to the embodiment of the present invention include determination information (A as shown in FIG. 7), connection destination information (B as shown in FIG. 7), and a parameter (C as shown in FIG. 7). It should be noted that the administration information according to the embodiment of the present invention is not limited to the example shown in FIG. 7. Herein, the determination information according to the embodiment of the present invention is, for example, information used to determine whether the communication target apparatus 200 indicated by the apparatus information is supported in the information processing system 1000 or not. The connection destination information according to the embodiment of the present invention is, for example, information for identifying the connection information generation server 600 storing the information for generating the connection information corresponding to the connection target apparatus 200 indicated by the apparatus information. The parameter according to the embodiment of the present invention is information used to generate the generation control information in the processing of step S106 as shown in FIG. 5.

In the below explanation, an example of generation control information generation processing will be explained using an example where the administration server 500 compares the received apparatus information and the administration information as shown in FIG. 7 (steps S200 to S204 of FIG. 5), and generates the generation control information based on a comparison result.

The administration server 500 determines whether the administration information includes a "Vender ID" matching the apparatus information (S200).

When the administration server 500 determines that there is no matching "Vender ID" in step S200, the administration server 500 notifies an error to the information processing apparatus 100 (S208). Herein, for example, the error notified in step S208 is transmitted to the information processing apparatus 100 via the relay server 400 (in a case where the server 300 has the relay server 400).

When the administration server 500 determines that there is a matching "Vender ID" in step S200, the administration server 500 determines whether the administration information includes an "apparatus type ID" matching the apparatus information (S202).

When the administration server 500 determines that there is no matching "apparatus type ID" in step S202, the administration server 500 notifies an error to the information processing apparatus 100 (S208).

When the administration server 500 determines that there is a matching "apparatus type ID" in step S202, the administration server 500 determines whether the "Serial ID" included in the apparatus information is within a predetermined range or not (S204). For example, the "Serial ID" included in the apparatus information is the fifth and sixth bytes of "address" shown in FIG. 4.

When the administration server 500 determines that the "Serial ID" included in the apparatus information is not within the predetermined range in step S204, the administration server 500 notifies an error to the information processing apparatus 100 (S208).

When the administration server 500 determines that the "Serial ID" included in the apparatus information is within the predetermined range in step S204, the administration server 500 generates the generation control information (S206). Herein, for example, when the apparatus information as shown in FIG. 4 is received, the administration server 500 uses information indicated by SEL in FIG. 7 to identify the connection information generation server 600, and uses the information indicated by SEL in FIG. 7 to generate the generation control information.

More specifically, the administration server 500 obtains a "URL" (Uniform Resource Locator) indicating the connection information generation server 600 identified in the processing of steps S200 to S204 from the administration information shown in FIG. 7 (S300).

Further, the administration server 500 obtains a parameter corresponding to the connection information generation server 600 identified in the processing of steps S200 to S204 from the administration information shown in FIG. 7, and attaches the obtained parameter to the "URL" obtained in step S300 (S302).

Then, the administration server 500 attaches the parameter based on the apparatus information to the information having the parameter attached in step S302 (S304).

For example, the administration server 500 performs the processing as shown in FIGS. 5 and 6 to generate the generation control information. FIG. 8 is an explanatory diagram illustrating an example of generation control information generated by the administration server 500 according to the embodiment of the present invention. Herein, the generation control information as shown in FIG. 8 is an example of generation control information generated by the administration server 500 based on the apparatus information shown in FIG. 4 and the administration information indicated by SEL in FIG. 7.

The generation control information generated by the administration server 500 according to the embodiment of the present invention is not limited to the example shown in FIG. 8. For example, in a case where the server 300 constituting the information processing system 1000 is not configured to include the relay server 400, the administration server 500 can also generate the generation control information similar to the later-explained connection information transmission request. Even in the above case, the administration server 500 can identify the connection information generation server 600 based on the connection destination information (B as shown in FIG. 7). Therefore, the administration server 500 can generate the connection information by transmitting the generation control information similar to the later-explained connection information transmission request to the identified connection information generation server 600.

FIG. 2 is referenced again, and an example of processing relating to the convenience improving approach performed in the information processing system 1000 according to the embodiment of the present invention will be explained. The administration server 500 transmits the generation control information generated in step S116 to the relay server 400 (S118). FIG. 2 shows the example in which the generation control information generated by the administration server 500 is transmitted to the relay server 400. However, the processing relating to the convenience improving approach according to the embodiment of the present invention is not limited to the example shown in FIG. 2. For example, the administration server 500 according to the embodiment of the present invention may directly (i.e., without relying on the relay server 400) transmit the generation control information to the connection information generation server 600 identified as the connection information generation server generating the connection information chosen from among the plurality of connection information generation servers 600 constituting the server 300.

The relay server 400 having received the generation control information from the administration server 500 in step S118 transmits the connection information transmission request based on the received generation control information to the connection information generation server 600 indicated by the generation control information (S120).

FIG. 9 is an explanatory diagram illustrating an example of a connection information transmission request transmitted by the relay server 400 according to the embodiment of the present invention. When FIG. 9 and FIG. 8 are compared here, it is found that the connection information transmission request as shown in FIG. 9 is information included in the generation control information as shown in FIG. 8. The relay server 400 identifies the connection information generation server 600 to which the connection information transmission request is transmitted, based on the connection destination information (B as shown in FIG. 7) included in the received generation control information, and transmits the connection information transmission request to the identified connection information generation server 600. In other words, the connection information transmission request as shown in FIG. 9 corresponds to the information for generating the connection information in the generation control information generated by the administration server 500.

FIG. 2 is referenced again, and an example of processing relating to the convenience improving approach in the information processing system 1000 according to the embodiment of the present invention will be explained. The connection information generation server 600 having received the connection information transmission request from the relay server 400 in step S120 generates the connection information based on the received connection information transmission request (S122; connection information generation processing).

[Example of Connection Information Generation Processing]

Figure 10:
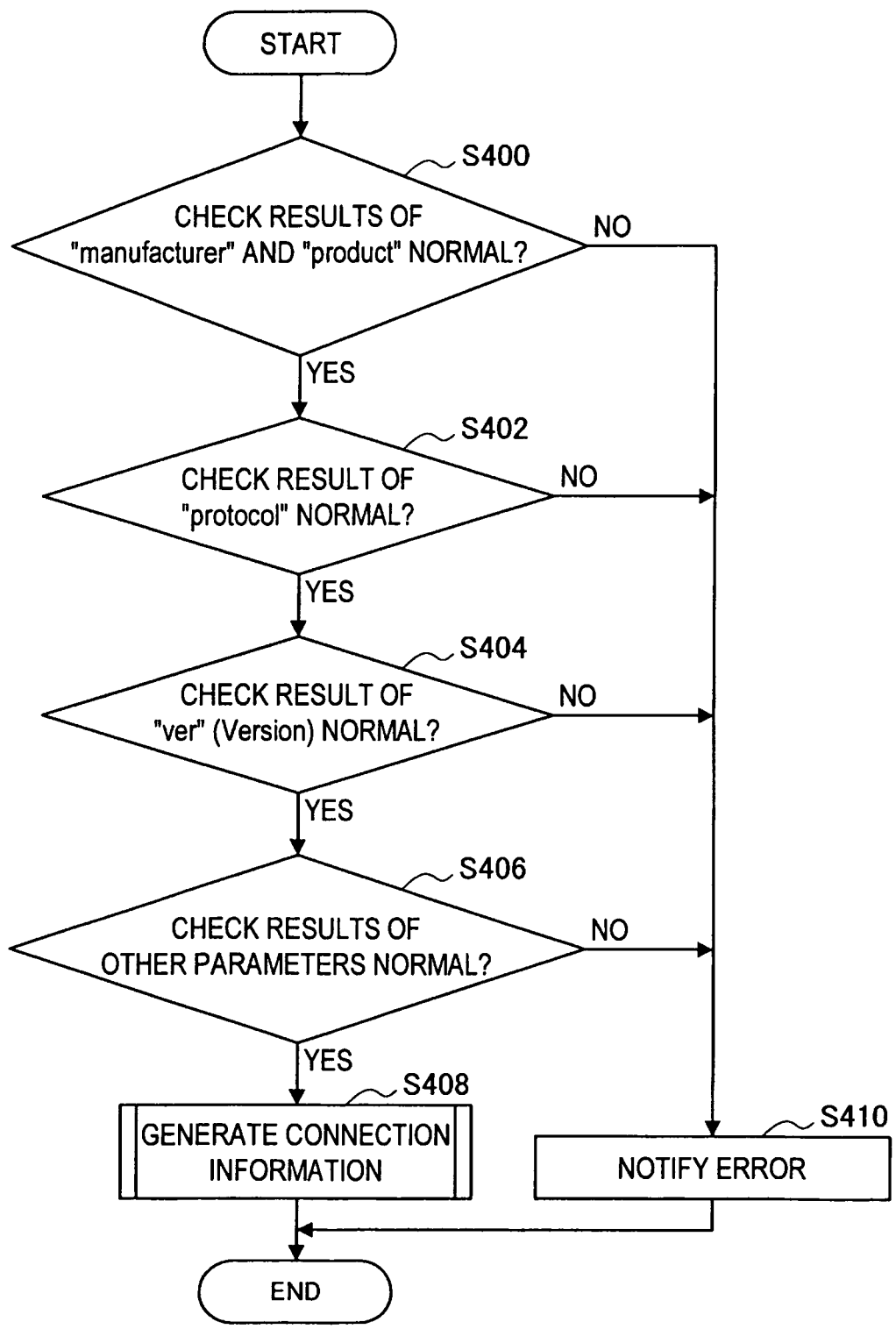
FIG. 10 is a flow diagram illustrating an example of connection information generation processing performed by a connection information generation server according to the embodiment of the present invention.
Figure 11:
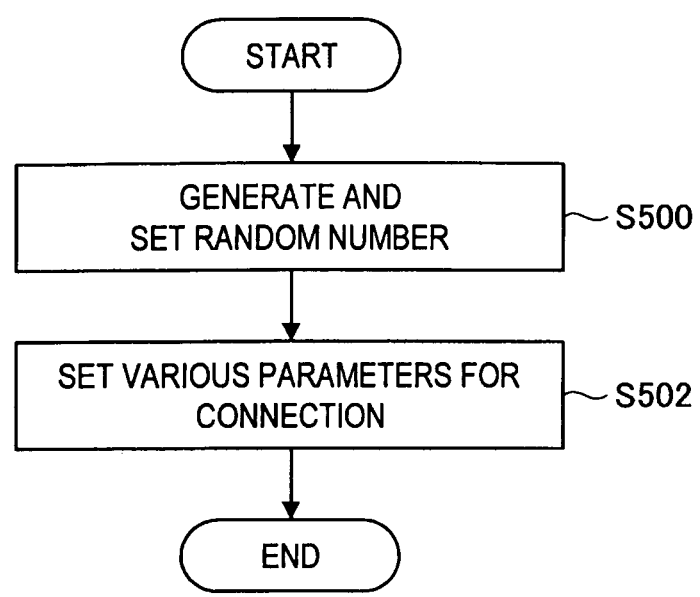
FIG. 11 is a flow diagram illustrating an example of connection information generation processing performed by a connection information generation server according to the embodiment of the present invention.

FIGS. 10 and 11 are flow diagrams illustrating an example of connection information generation processing performed by the connection information generation server 600 according to the embodiment of the present invention. Herein, FIG. 11 shows, in a more specific manner, the processing of step S408 shown in FIG. 10. In the below explanation, an example of connection information generation processing will be explained using an example where the connection information generation server 600 compares the received connection information transmission request (alternatively, the received generation control information) and stored information for generating connection information (not shown) (steps S400 to S406 of FIG. 10) and generates the connection information based on the comparison result.

The connection information generation server 600 checks parameters of "manufacturer" and "product" included in the received connection information transmission request, and determines whether the check result is normal or not (S400).

When the check result is not determined to be normal in step S400, the connection information generation server 600 notifies an error to the information processing apparatus 100 (S410). Herein, for example, the error notified in step S410 is transmitted to the information processing apparatus 100 via the relay server 400 (in a case where the server 300 includes the relay server 400).

On the other hand, when the check result is determined to be normal in step S400, the connection information generation server 600 checks a parameter of "protocol" included in the received connection information transmission request, and determines whether the check result is normal or not (S402).

When the check result is not determined to be normal in step S402, the connection information generation server 600 notifies an error to the information processing apparatus 100 (S410).

On the other hand, when the check result is determined to be normal in step S402, the connection information generation server 600 checks a parameter of "ver" (version) included in the received connection information transmission request, and determines whether the check result is normal or not (S404).

When the check result is not determined to be normal in step S404, the connection information generation server 600 notifies an error to the information processing apparatus 100 (S410).

On the other hand, when the check result is determined to be normal in step S404, the connection information generation server 600 checks another parameter included in the received connection information transmission request, and determines whether the check result is normal or not (S406). It should be noted that the connection information generation server 600 may not perform the processing of step S406 in a case where, for example, the received connection information transmission request includes no other parameter or a case where the received connection information transmission request includes a parameter which does not need to be checked.

When the check result is determined not to be normal in step S406, the connection information generation server 600 notifies an error to the information processing apparatus 100 (S410).

On the other hand, when the check result is determined to be normal in step S406, the connection information generation server 600 generates the connection information based on the information for generating the connection information corresponding to the connection information transmission request (the information for generating the connection information satisfying the conditions of steps S400 to S406) (S408).

More specifically, the connection information generation server 600 generates a random number, and sets the generated random number (S500). In addition, the connection information generation server 600 obtains the information for generating the connection information satisfying the conditions of steps S400 to S406 in the information for generating the connection information, and sets various kinds of parameters (S502).

Figure 12:
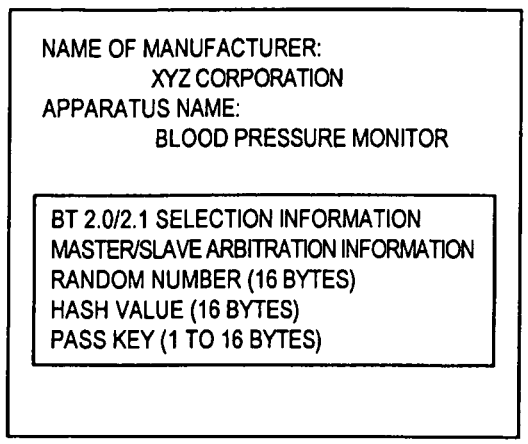
FIG. 12 is an explanatory diagram illustrating an example of connection information generated by the connection information generation server according to the embodiment of the present invention.

For example, the connection information generation server 600 generates the connection information by performing the processing as shown in FIG. 10 and FIG. 11. FIG. 12 is an explanatory diagram illustrating an example of connection information generated by the connection information generation server 600 according to the embodiment of the present invention. Herein, FIG. 12 is an example of connection information for allowing the information processing apparatus 100 and the communication target apparatus 200 to communicate with each other via a communication path formed by IEEE 802.15.1. It should be noted that the connection information generated by the administration server 500 according to the embodiment of the present invention is not limited to the example shown in FIG. 12. For example, in the administration server 500 according to the embodiment of the present invention, the connection information may further include the information included in the connection information transmission request as shown in FIG. 9.

FIG. 2 is referenced again, and an example of processing relating to the convenience improving approach in the information processing system 1000 according to the embodiment of the present invention will be explained. The connection information generation server 600 transmits the connection information generated in step S122 to the relay server 400 (S124).

In a case where the connection information generation server 600 receives the generation control information from the administration server 500 without relying on the relay server 400, the connection information generation server 600 can transmit the generated connection information to the information processing apparatus 100 via the administration server 500 or directly, for example.

In step S124, the relay server 400 having received the connection information from the connection information generation server 600 transmits the received connection information to the information processing apparatus 100 (S126).

The information processing apparatus 100 having received the connection information from the server 300 (for example, the connection information transmitted from the relay server 400 in step S126) determines the connection target apparatus 200 with which the information processing apparatus 100 communicates via the first communication path (S128; connection target determination processing).

Figure 13:
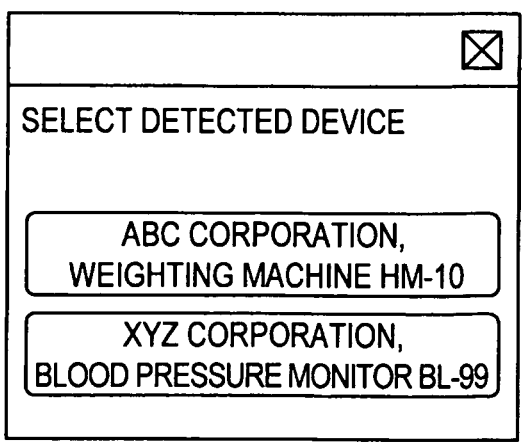
FIG. 13 is an explanatory diagram illustrating an example of connection target determination processing performed by the information processing apparatus according to the embodiment of the present invention.

FIG. 13 is an explanatory diagram illustrating an example of connection target determination processing performed by the information processing apparatus 100 according to the embodiment of the present invention. Herein, FIG. 13 shows an example of selection screen of the connection target apparatuses 200 displayed on the information processing apparatus 100 (an example of display screen).

For example, the information processing apparatus 100 displays, on the display screen, a list of communication target apparatuses 200 according to the connection information transmitted from the server 300. Then, the information processing apparatus 100 determines a communication target apparatus 200 with which a user wants to make a connection, as the communication target apparatus 200 with which communication is to be performed via the first communication path, based on an operation signal according to a user operation transmitted from the (later-explained) operation unit arranged on the information processing apparatus 100, for example.

The connection target determination processing performed by the information processing apparatus 100 according to the embodiment of the present invention is not limited to the above. For example, in a case where there is only one communication target apparatus 200 according to the connection information transmitted from the server 300, the information processing apparatus 100 can determine the communication target apparatus 200 according to the connection information, as the communication target apparatus 200 with which communication is to be performed via the first communication path, without displaying the selection screen as shown in FIG. 13. On the other hand, in a case where there are a plurality of communication target apparatuses 200 according to the connection information transmitted from the server 300, the information processing apparatus 100 can select a previously-set number of communication target apparatuses 200 from among the communication target apparatuses 200 according to the connection information, and determine the selected communication target apparatuses 200 as the communication target apparatuses 200 with which communication is to be performed via the first communication path.

Further, when the information processing apparatus 100 determines the connection target apparatus 200 with which communication is to be performed via the first communication path, the information processing apparatus 100 determines whether processing data used to start communication with the connection target apparatus 200 via the first communication path are insufficient or not. At this occasion, in a case where the information processing apparatus 100 determines that the processing data are not insufficient as a result of the above determination, the information processing apparatus 100 performs later-explained processing of S150 to start communication with the connection target apparatus 200 via the first communication path. On the other hand, in a case where the information processing apparatus 100 determines that the processing data are insufficient as a result of the above determination, the information processing apparatus 100 performs later-explained processing of S130 to S148 with the server 300. In the below explanation, the processing relating to the convenience improving approach in the information processing system 1000 according to the embodiment of the present invention will be explained using an example where the information processing apparatus 100 determines that the processing data are insufficient as a result of the above determination.

When the information processing apparatus 100 determines that the processing data are insufficient, the information processing apparatus 100 transmits the data transmission request to the relay server 400 (S130). For example, the data transmission request transmitted by the information processing apparatus 100 is data similar to the connection information transmission request as shown in FIG. 9. However, the data transmission request transmitted by the information processing apparatus 100 is not limited to the above. In the below explanation, a case will be explained as an example where the information processing apparatus 100 transmits data similar to the connection information transmission request as shown in FIG. 9 as the data transmission request.

The relay server 400 having received the data transmission request transmitted from the information processing apparatus 100 in step S130 transmits the received data transmission request to the data storage server 700 (S132).

The data storage server 700 having received the data transmission request from the relay server 400 in step S132 transmits processing data corresponding to the received data transmission request to the relay server 400 (S134; processing data transmission processing).

[Example of Processing Data Transmission Processing]

Figure 14:
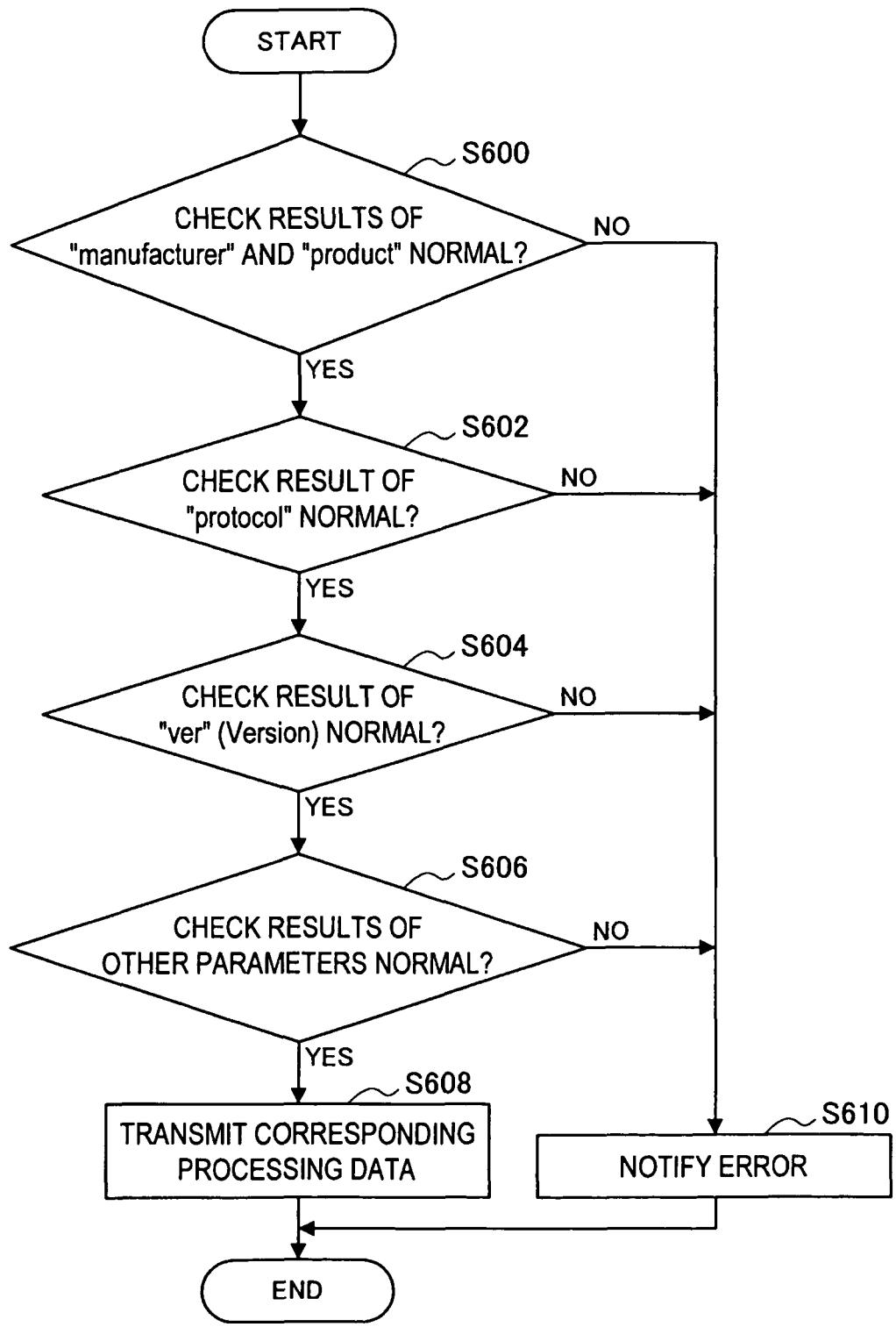
FIG. 14 is a flow diagram illustrating an example of processing data transmission processing performed by a data storage server according to the embodiment of the present invention.

FIG. 14 is a flow diagram illustrating an example of processing data transmission processing performed by the data storage server 700 according to the embodiment of the present invention. In the below explanation, an example of processing data transmission processing will be explained using an example where the data storage server 700 compares the received data transmission request and information representing processing data to be stored (not shown) (steps S600 to S606 of FIG. 14), and transmits the processing data corresponding to the data transmission request based on the comparison result.

The data storage server 700 checks parameters of "manufacturer" and "product" included in the received data transmission request, and determines whether the check result is normal or not (S600).

When the check result is not determined to be normal in step S600, the data storage server 700 notifies an error to the information processing apparatus 100 (S610). Herein, for example, the error notified in step S610 is transmitted to the information processing apparatus 100 via the relay server 400 (in a case where the server 300 includes the relay server 400).

On the other hand, when the check result is determined to be normal in step S600, the data storage server 700 checks a parameter of "protocol" included in the received data transmission request, and determines whether the check result is normal or not (S602).

When the check result is not determined to be normal in step S602, the data storage server 700 notifies an error to the information processing apparatus 100 (S610).

On the other hand, when the check result is determined to be normal in step S602, the data storage server 700 checks a parameter of "ver" (version) included in the received data transmission request, and determines whether the check result is normal or not (S604).

When the check result is not determined to be normal in step S604, the data storage server 700 notifies an error to the information processing apparatus 100 (S610).

On the other hand, when the check result is determined to be normal in step S604, the data storage server 700 checks another parameter included in the received data transmission request, and determines whether the check result is normal or not (S606). It should be noted that the data storage server 700 may not perform the processing of step S606 in a case where, for example, the received data transmission request includes no other parameter or a case where the received data transmission request includes a parameter which does not need to be checked.

When the check result is determined not to be normal in step S606, the data storage server 700 notifies an error to the information processing apparatus 100 (S610).

On the other hand, when the check result is determined to be normal in step S606, the data storage server 700 transmits processing data corresponding to the information representing processing data satisfying the conditions of steps S600 to S606 (S608).

For example, the data storage server 700 transmits the processing data corresponding to the received data transmission request to the relay server 400 by performing the processing as shown in FIG. 14. It is to be understood that the processing data transmission processing performed by the data storage server 700 according to the embodiment of the present invention is not limited to the example shown in FIG. 14.

FIG. 2 is referenced again, and an example of processing relating to the convenience improving approach performed in the information processing system 1000 according to the embodiment of the present invention will be explained. The relay server 400 having received the processing data from the data storage server 700 in step S134 transmits, to the information processing apparatus 100, the received processing data and an installation request serving as a trigger for executing the processing data (S136). For example, in a case where the information processing apparatus 100 according to the embodiment of the present invention has a function of automatically executing the processing data according to reception of the processing data, the relay server 400 may not transmit the installation request in step S136.

Figure 15:
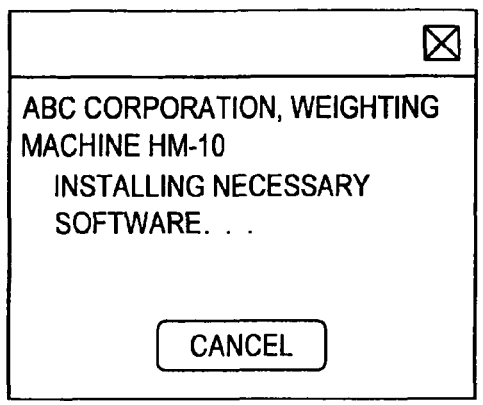
FIG. 15 is an explanatory diagram illustrating an example of a display screen displayed on the information processing apparatus according to the embodiment of the present invention.

The information processing apparatus 100 having received the processing data from the relay server 400 in step S136 installs the received processing data (S138). FIG. 15 is an explanatory diagram illustrating an example of a display screen displayed on the information processing apparatus 100 according to the embodiment of the present invention, and shows the example of the display screen displayed during the execution of installation of the processing data. When the installation is completed, the information processing apparatus 100 transmits a response according to the processing result to the relay server 400 (S140).

For example, when the relay server 400 receives, from the information processing apparatus 100, the response indicating a normal completion of processing in step S140, the relay server 400 transmits, to the information processing apparatus 100, an execution request for executing the installed processing data (S142). Although not shown in FIG. 2, when the response transmitted from the information processing apparatus 100 in step S140 indicates that the processing is not completed normally, the relay server 400 may perform the processing of step S136 again.

The information processing apparatus 100 having received the execution request from the relay server 400 in step S142 executes the processing data installed in step S138 (S144; execution processing). In a case where the information processing apparatus 100 has a function of automatically executing the processing data installed in step S138, the information processing system 1000 according to the embodiment of the present invention may not perform the processing of steps S140, S142.

When the execution of the processing data is completed in step S144, the information processing apparatus 100 transmits a response according to the processing result to the relay server 400 (S146).

For example, when the relay server 400 receives, from the information processing apparatus 100, the response indicating a normal completion of processing in step S146, the relay server 400 transmits, to the information processing apparatus 100, a connection request for starting communication with the connection target apparatus 200 determined in step S128 via the first communication path (S148). Although not shown in FIG. 2, when the response transmitted from the information processing apparatus 100 in step S146 indicates that the processing is not completed normally, the relay server 400 may perform the processing of step S140 again.

The information processing apparatus 100 having received the connection request from the relay server 400 in step S148 starts communication with the connection target apparatus 200 determined in step S128 via the first communication path (S150; connection processing). In a case where the information processing apparatus 100 has a function of automatically starting communication with the connection target apparatus 200 via the first communication path based on the processing data executed in step S144 and the connection information, it may not necessary to perform the processing of step S146, S148 in the information processing system 1000 according to the embodiment of the present invention.

Figure 16:
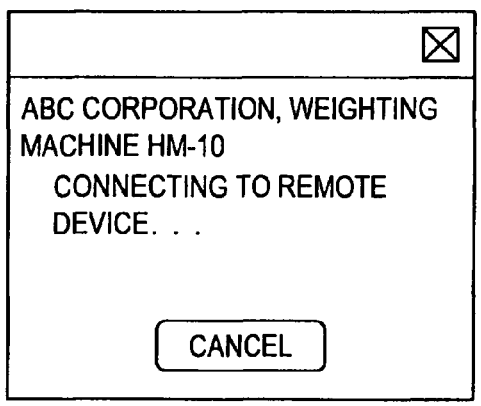
FIG. 16 is an explanatory diagram illustrating an example of a display screen displayed on the information processing apparatus according to the embodiment of the present invention.
Figure 17:
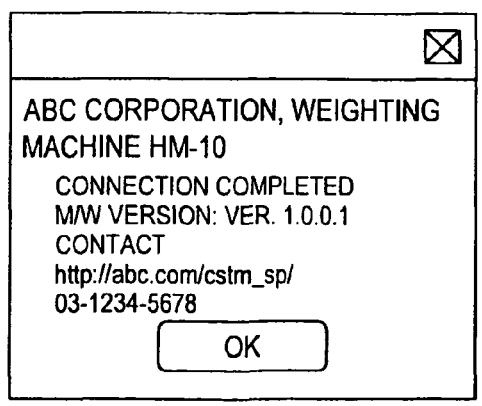
FIG. 17 is an explanatory diagram illustrating an example of a display screen displayed on the information processing apparatus according to the embodiment of the present invention.

FIGS. 16 and 17 are explanatory diagrams illustrating examples of display screens displayed on the information processing apparatus 100 according to the embodiment of the present invention. Herein, FIG. 16 shows an example of display screen displayed when the information processing apparatus 100 performs processing to communicate with the connection target apparatus 200 determined in step S128 via the first communication path. On the other hand, FIG. 17 shows an example of display screen displayed when the information processing apparatus 100 finishes the processing for communicating with the connection target apparatus 200 determined in step S128 via the first communication path.

For example, the information processing system 1000 performs the processing as shown in FIG. 2 in order to start communication between the information processing apparatus 100 and the connection target apparatus 200 via the first communication path. Herein, in the information processing system 1000, the user can start communication between the information processing apparatus 100 and the connection target apparatus 200 via the first communication path by performing, for example, the processing shown in FIG. 2 without bringing the information processing apparatus 100 and the connection target apparatus 200 into proximity to each other. Therefore, the above-described convenience improving approach according to the embodiment of the present invention is achieved by performing, for example, the processing shown in FIG. 2.

Therefore, since the information processing system performs, for example, the processing shown in FIG. 2, the information processing system is achieved that can improve the convenience of the user when the user starts communication between the information processing apparatus 100 and the connection target apparatus 200 with which the communication is to be performed.

The processing relating to the convenience improving approach in the information processing system 1000 according to the embodiment of the present invention is not limited to the example shown in FIG. 2. For example, in a case where the server 300 constituting the information processing system 1000 is not configured to include the relay server 400, the information processing apparatus 100 may communicate with each server constituting the server 300. On the other hand, in a case where the server 300 constituting the information processing system 1000 is not the server set as shown in FIG. 1 but is one server, the processing performed by the server 300 as shown in FIG. 2 are performed by the one server.

Figure 18:
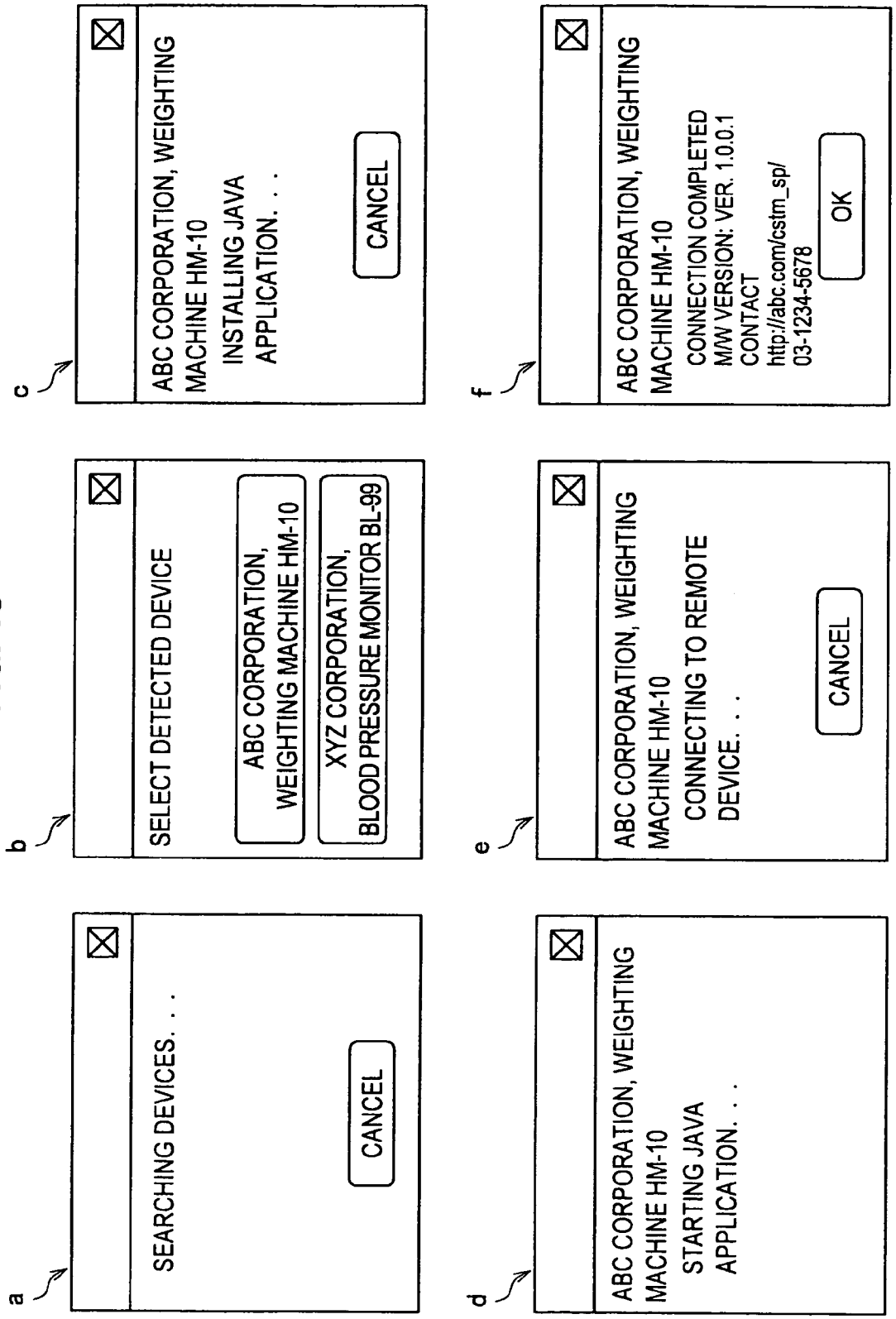
FIG. 18 is an explanatory diagram illustrating another example of a display screen displayed on the information processing apparatus according to the embodiment of the present invention in the processing relating to the convenience improving approach according to the embodiment of the present invention.

Although FIG. 3 and FIGS. 12 to 17 are shown as the examples of display screens displayed on the information processing apparatus 100 according to the embodiment of the present invention, the display screens displayed on information processing apparatus 100 according to the embodiment of the present invention during the processing relating to the convenience improving approach are not limited to the above. FIG. 18 is an explanatory diagram illustrating another example of display screens displayed on the information processing apparatus 100 according to the embodiment of the present invention in the processing relating to the convenience improving approach according to the embodiment of the present invention. Herein, FIG. 18 shows the examples of display screens displayed on the information processing apparatus 100 in a case where the information processing apparatus 100 according to the embodiment of the present invention is, for example, a portable telephone and where a JAVA (registered trademark) application is executed as processing data.

(Information Processing System According to the Embodiment of the Present Invention)

Subsequently, an example of configuration of each apparatus constituting the information processing system 1000 capable of achieving the processing relating to the above-explained convenience improving approach according to the embodiment of the present invention will be explained. In the below explanation, the configuration will be explained using an example where the server 300 constituting the information processing system 1000 is the server set as shown in FIG. 1.

[Information Processing Apparatus 100]

Figure 19:
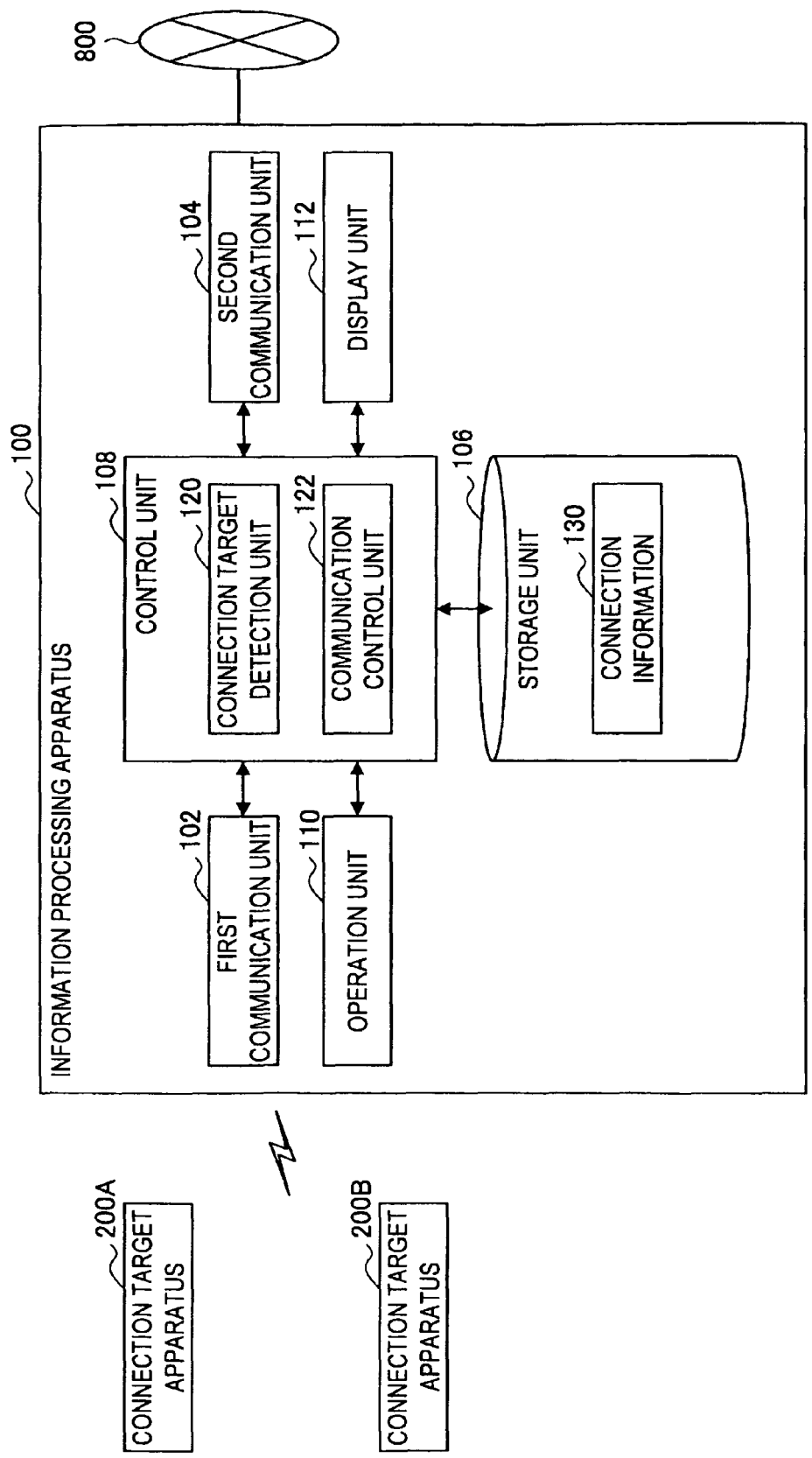
FIG. 19 is a block diagram illustrating an example of a configuration of the information processing apparatus according to the embodiment of the present invention.

FIG. 19 is a block diagram illustrating an example of a configuration of the information processing apparatus 100 according to the embodiment of the present invention. Herein, FIG. 19 shows the network 800 as well as the connection target apparatuses 200A, 200B as shown in FIG. 1.

The information processing apparatus 100 includes a first communication unit 102, a second communication unit 104, a storage unit 106, a control unit 108, an operation unit 110, and a display unit 112.

Further, the information processing apparatus 100 may include, for example, a ROM (Read Only Memory; not shown) and a RAM (Random Access Memory; not shown). For example, in the information processing apparatus 100, each constituent element is connected via a bus serving as a data transmission path. Herein, the ROM (not shown) stores control data such as programs and calculation parameters used by the control unit 108. The RAM (not shown) primarily stores programs executed by the control unit 108.

[Hardware Configuration Example of Information Processing Apparatus 100]

Figure 20:
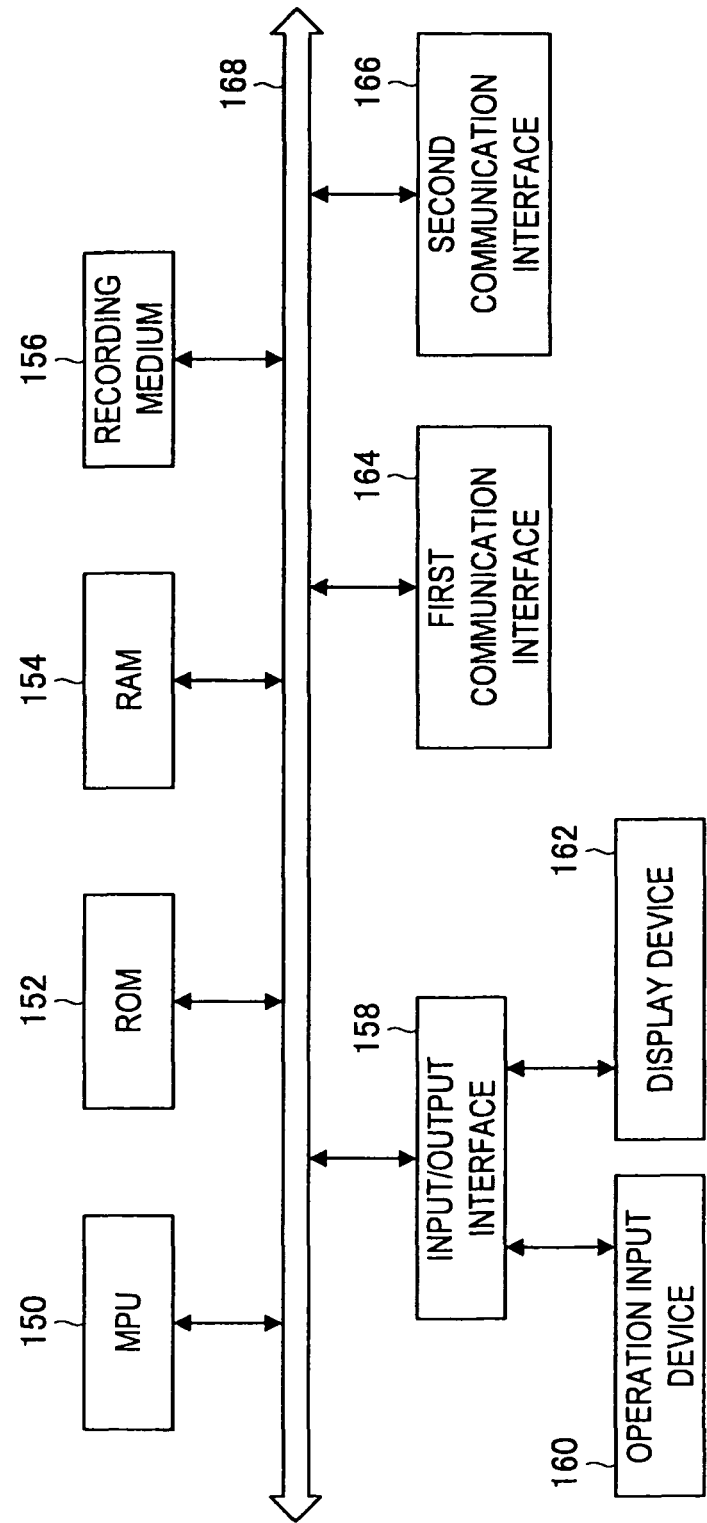
FIG. 20 is an explanatory diagram illustrating an example of a hardware configuration of the information processing apparatus according to the embodiment of the present invention.

FIG. 20 is an explanatory diagram illustrating an example of a hardware configuration of the information processing apparatus 100 according to the embodiment of the present invention. When FIG. 20 is referenced, it is understood that the information processing apparatus 100 includes, for example, an MPU 150, a ROM 152, a RAM 154, a recording medium 156, an input/output interface 158, an operation input device 160, a display device 162, a first communication interface 164, and a first communication interface 166. Further, for example, in the information processing apparatus 100, constituent elements are connected via a bus 168 serving as a data transmission path.

The MPU 150 is constituted by an MPU (Micro Processing Unit), an integrated circuit in which a plurality of circuits for achieving control functions are integrated, and the like. The MPU 150 serves as the control unit 108 for controlling the entire information processing apparatus 100. In the information processing apparatus 100, the MPU 150 can also serve as the later-explained connection target detection unit 120 and the later-explained communication control unit 122.

The ROM 152 stores control data such as programs and calculation parameters used by the MPU 150. The RAM 154 primarily stores, for example, programs executed by the MPU 150.

The recording medium 156 serves as the storage unit 106, and stores, for example, various data such as applications and connection information. Herein, examples of the recording medium 156 include a magnetic recording medium such as a hard disk and a nonvolatile memory such as an EEPROM (Electrically Erasable and Programmable Read Only Memory), a flash memory, an MRAM (Magnetoresistive Random Access Memory), an FeRAM (Ferroelectric Random Access Memory), and a PRAM (Phase change Random Access Memory). Alternatively, the information processing apparatus 100 may include a recording medium 156 detachably attached to the information processing apparatus 100.

The input/output interface 158 is connected to, for example, the operation input device 160 and the display device 162. The operation input device 160 serves as the operation unit 110. On the other hand, the display device 162 serves as the display unit 112. Herein, examples of the input/output interface 158 include a USB (Universal Serial Bus) terminal, a DVI (Digital Visual Interface) terminal, an HDMI (High-Definition Multimedia Interface) terminal, and various kinds of processing circuits. The operation input device 160 is arranged in, for example, the information processing apparatus 100, and is connected to the input/output interface 158 in the information processing apparatus 100. Examples of the operation input device 160 include buttons, arrow keys, a rotation-type selector such as a jog dial, and a combination thereof. The display device 162 is arranged in, for example, the information processing apparatus 100, and is connected to the input/output interface 158 in the information processing apparatus 100. Examples of the display device 162 include a Liquid Crystal Display (LCD) and an organic ElectroLuminescence (EL) display (which is also referred to as an Organic Light Emitting Diode (OLED) display). It is to be understood that the input/output interface 158 can be connected to operation input devices (such as a keyboard and a mouse) serving as an external device of the information processing apparatus 100 and a display device (such as an external display). For example, the display device 162 may be a device, such as a touch screen, capable of not only displaying screens but also receiving user operation.

The first communication interface 164 is first communication means arranged in the information processing apparatus 100, and serves as the first communication unit 102 communicating with the communication target apparatus 200 via the first communication path. Herein, examples of the first communication interface 164 include an IEEE 802.11g port and a transmission/reception circuit therefor, an IEEE 802.15.1 port and a transmission/reception circuit therefor, and the like.

The second communication interface 166 is second communication means arranged in the information processing apparatus 100, and serves as the second communication unit 104 communicating with the server 300 via the second communication path. Herein, examples of the second communication interface 164 include a LAN terminal and a transmission/reception circuit therefor, an IEEE 802.11g port and a transmission/reception circuit therefor, and a communication antenna and an RF (Radio Frequency) circuit therefor. However, the second communication interface 164 is not limited to the above. For example, the second communication interface 164 may have any configuration capable of communicating with an external apparatus such as the server 300 via the network 800.

The information processing apparatus 100 has, for example, the configuration shown in FIG. 20 to perform the processing relating to the convenience improving approach according to the embodiment of the present invention. It should be noted that the hardware configuration of the information processing apparatus 100 according to the embodiment of the present invention is not limited to the configuration as shown in FIG. 20. For example, the information processing apparatus 100 may have a DSP (Digital Signal Processor) and an audio output device including an amplifier and a speaker. When the information processing apparatus 100 has the above DSP and the audio output device, the information processing apparatus 100 can audibly notify an error transmitted from the server 300 to the user.

[Example Of Software Configuration Of Information Processing Apparatus 100]

Figure 21:
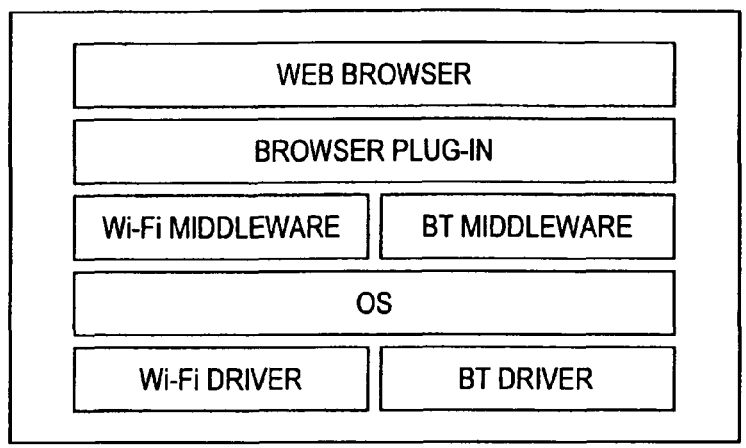
FIG. 21 is an explanatory diagram illustrating an example of a software configuration of the information processing apparatus according to the embodiment of the present invention.
Figure 22:
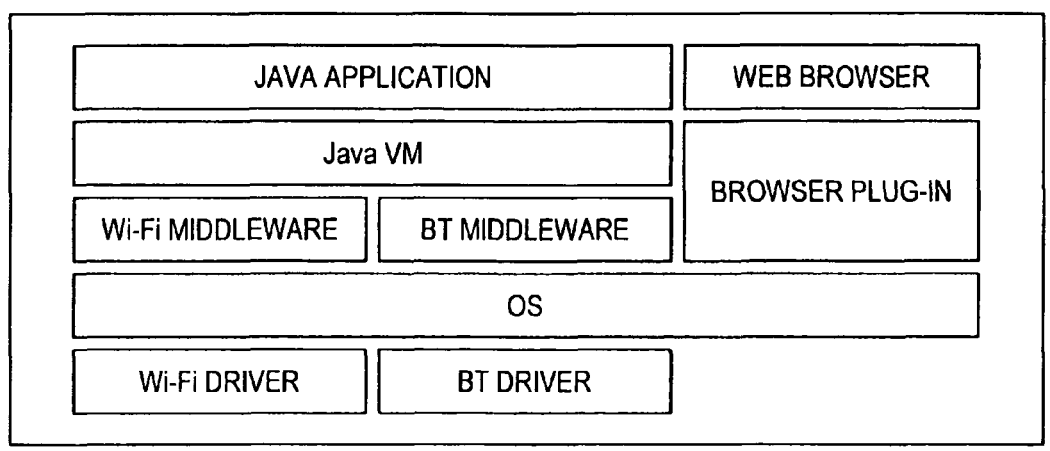
FIG. 22 is an explanatory diagram illustrating an example of a software configuration of the information processing apparatus according to the embodiment of the present invention.

FIGS. 21 and 22 are explanatory diagrams illustrating examples of software configurations of the information processing apparatus 100 according to the embodiment of the present invention. Herein, FIG. 21 shows an example of software configuration in a case where the information processing apparatus 100 is, for example, a computer such as a PC (personal computer). On the other hand, FIG. 22 shows an example of software configuration in a case where the information processing apparatus 100 is, for example, a portable communication apparatus such as a portable telephone.

The information processing apparatus 100 has, for example, the software configuration as shown in FIGS. 21 and 22, which enables the communication via the first communication path and the communication via the second communication path. It is to be understood that the software configuration in the information processing apparatus 100 according to the embodiment of the present invention is not limited to the configurations as shown in FIGS. 21 and 22.

FIG. 19 is referenced again, and constituent elements of the information processing apparatus 100 will be explained. The first communication unit 102 is the first communication means of the information processing apparatus 100, and the first communication unit 102 communicates with the communication target apparatus 200 via the first communication path. The control unit 108 (more specifically, the communication control unit 122) controls communication of the first communication unit 102. Herein, examples of the first communication unit 102 include an IEEE 802.11g port and a transmission/reception circuit therefor, an IEEE 802.15.1 port and a transmission/reception circuit therefor, and the like.

The second communication unit 104 is the second communication means arranged in the information processing apparatus 100, and communicates with the server 300 via the second communication path. The control unit 108 (more specifically, the communication control unit 122) controls communication of the second communication unit 104. Herein, examples of the second communication unit 104 include a LAN terminal and a transmission/reception circuit therefor, an IEEE 802.11g port and a transmission/reception circuit therefor, and a communication antenna and an RF (Radio Frequency) circuit therefor.

The storage unit 106 is storage means arranged in the information processing apparatus 100. Herein, examples of the storage unit 106 include a magnetic recording medium such as a hard disk and a nonvolatile memory such as a flash memory.

The storage unit 106 stores, for example, various data such as applications and connection information. Herein, FIG. 19 shows an example where one piece of connection information 130 is stored in the storage unit 106.

For example, the control unit 108 is constituted by an MPU and an integrated circuit in which various kinds of processing circuits are integrated. The control unit 108 controls the entire information processing apparatus 100. Further, the control unit 108 includes the connection target detection unit 120 and the communication control unit 122, and plays a leading role in the processing relating to the convenience improving approach according to the embodiment of the present invention in the information processing apparatus 100. In addition, the control unit 108 may include, for example, a processing unit (not shown) for executing processing data and various kinds of applications.

The connection target detection unit 120 detects the connection target apparatus 200 with which communication is to be performed via the first communication path, and generates the apparatus information indicating the detected connection target apparatus 200. For example, in the processing relating to the convenience improving approach as shown in FIG. 2, the connection target detection unit 120 plays a leading role in the processing of step S110.

The communication control unit 122 controls communication via the first communication unit 102 and communication via the second communication unit 104, and plays a leading role in the processing relating to the convenience improving approach according to the embodiment of the present invention (the processing performed in the information processing apparatus 100) as shown in FIG. 2, for example. More specifically, for example, when the connection target detection unit 120 generates the apparatus information, the communication control unit 122 transmits the apparatus information generated by the connection target detection unit 120 to the server 300 via the second communication unit 104. For example, when the second communication unit 104 receives the connection information based on the apparatus information, the communication control unit 122 starts communication with the connection target apparatus 200 corresponding to the connection information via the first communication unit 102, based on the connection information received by the second communication unit 104.

For example, in a case where the communication control unit 122 has insufficient processing data used (executed) to start communication via the first communication path based on the connection information received by the second communication unit 104, the communication control unit 122 transmits a data transmission request via the second communication unit 104 to the server 300. Then, when the second communication unit 104 receives processing data transmitted by the server 300 in response to the data transmission request, the communication control unit 122 uses the received processing data to start communication via the first communication path. Herein, for example, the communication control unit 122 cooperates with a processing unit (not shown) and uses the processing data executed by the processing unit (not shown). However, the processing executed by the communication control unit 122 is not limited to the above. For example, the communication control unit 122 may execute the processing data received by the second communication unit 104, and may use the executed processing data.

Further, the control unit 108 includes, for example, the connection target detection unit 120 and the communication control unit 122, and thus plays a leading role in the processing relating to the convenience improving approach according to the embodiment of the present invention in the information processing apparatus 100. However, the configuration of the control unit 108 arranged in the information processing apparatus 100 according to the embodiment of the present invention is not limited to the example shown in FIG. 19. For example, the information processing apparatus 100 according to the embodiment of the present invention may have any configuration capable of achieving the processing relating to the convenience improving approach according to the embodiment of the present invention in the information processing apparatus 100 as shown in FIG. 2.

The operation unit 110 is operation means possessed by the information processing apparatus 100 to enable a user to perform operation. Since the information processing apparatus 100 has the operation unit 110, the information processing apparatus 100 allows a user to perform operation and can carry out a processing desired by the user according to the operation performed by the user. Examples of the operation unit 110 include buttons, arrow keys, a rotation-type selector such as a jog dial, and a combination thereof.

The display unit 112 is display means arranged in the information processing apparatus 100, and displays various kinds of information on the display screen. Examples of screens displayed on the display screen of the display unit 112 include the screens as shown in FIG. 3 and FIGS. 12 to 18, an error display screen, and an operation screen for causing the information processing apparatus 100 to perform a desired operation. Herein, examples of the display unit 112 include an LCD and an organic EL display. Alternatively, in the information processing apparatus 100, the display unit 112 may be made with, for example, a touch screen. In this case, the display unit 112 serves as an operation display unit capable of not only displaying screens but also receiving user operation.

Since the information processing apparatus 100 has, for example, the configuration shown in FIG. 19, the information processing apparatus 100 can achieve the processing relating to the convenience improving approach according to the embodiment of the present invention. Therefore, with the configuration shown in FIG. 19, the information processing apparatus 100 may achieve the information processing system that can improve the convenience of the user when the user starts communication between the information processing apparatus and the connection target apparatus with which the communication is to be performed.

It should be noted that the configuration of the information processing apparatus 100 according to the embodiment of the present invention is not limited to the example shown in FIG. 19. For example, the information processing apparatus 100 according to the embodiment of the present invention may further include a reception unit (not shown) for receiving an external operation signal transmitted from an external operation device such as a remote controller.

Figure 23:
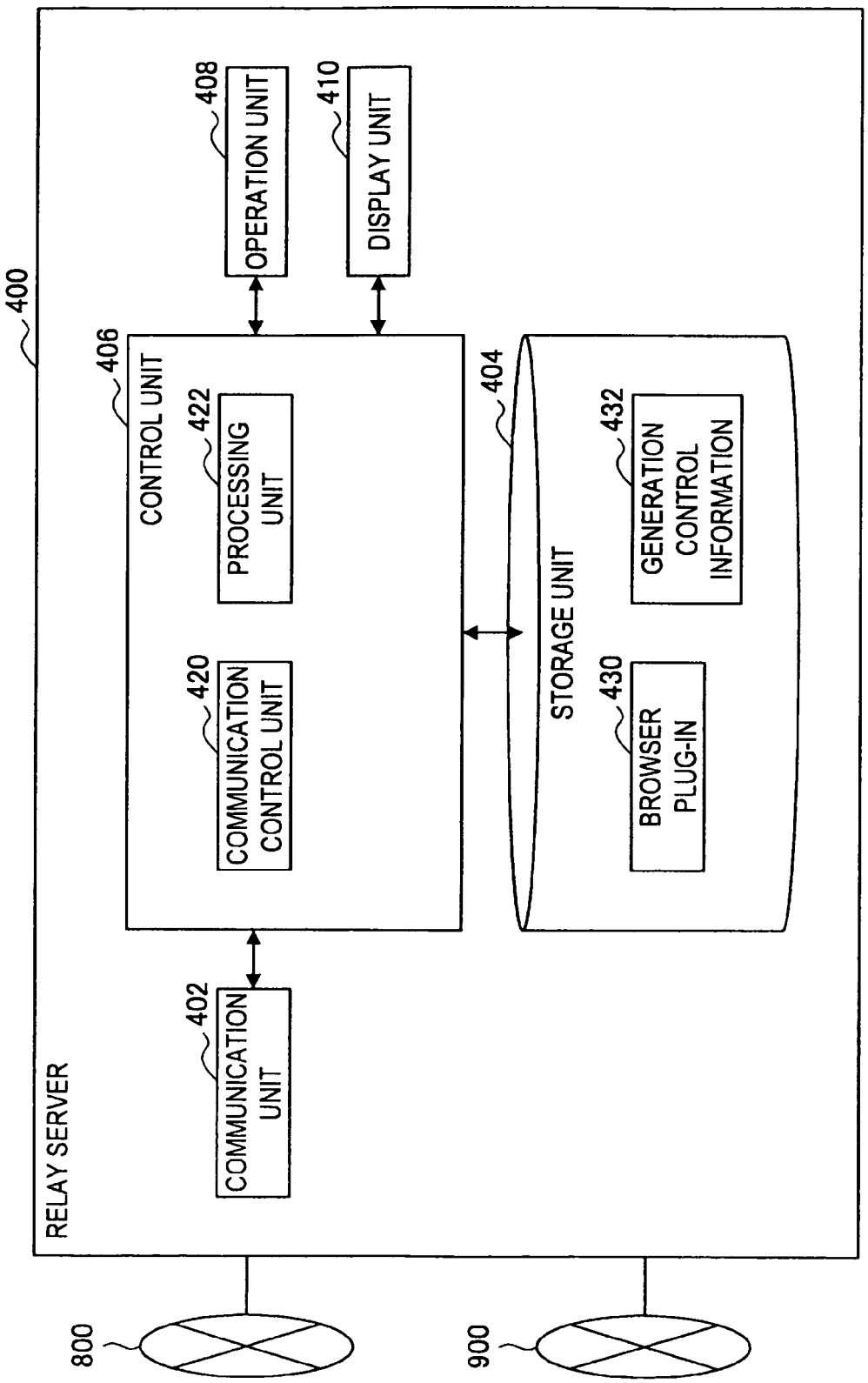
FIG. 23 is a block diagram illustrating an example of a configuration of the relay server according to the embodiment of the present invention.

[Server 300]
[A] Relay Server 400
FIG. 23 is a block diagram illustrating an example of a configuration of the relay server 400 according to the embodiment of the present invention. Herein, in FIG. 23, the networks 800, 900 are shown.

The relay server 400 includes a communication unit 402, a storage unit 404, a control unit 406, an operation unit 408, and a display unit 410.

Further, the relay server 400 may include, for example, a ROM (not shown), a RAM (not shown), and a storage unit (not shown). The relay server 400 uses, for example, a bus serving as a data transmission path to connect each constituent element. Herein, the ROM (not shown) stores control data such as programs and calculation parameters used by the control unit 406. The RAM (not shown) primarily stores programs executed by the control unit 406.

Figure 24:
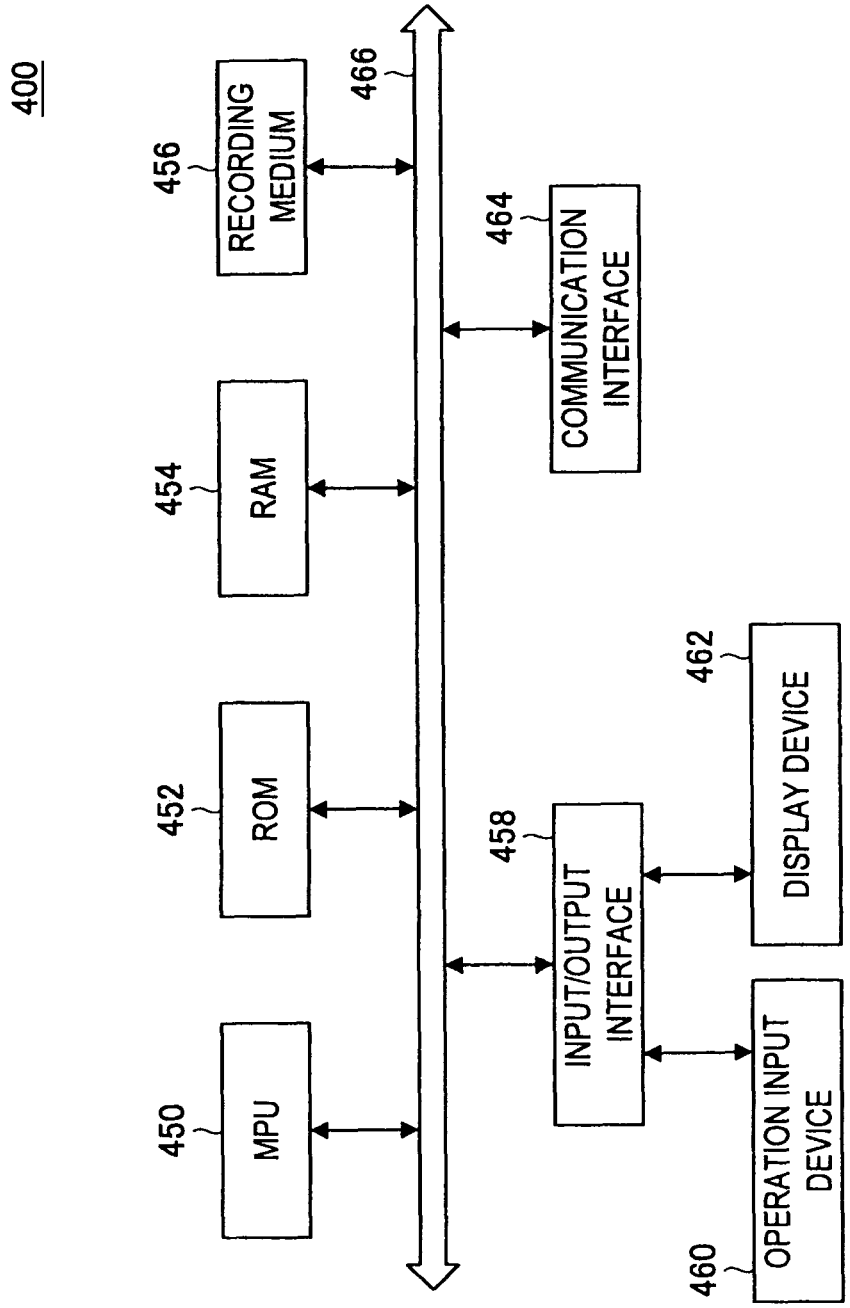
FIG. 24 is a block diagram illustrating an example of a hardware configuration of the relay server according to the embodiment of the present invention.

[Hardware Configuration Example of Relay Server 400]
FIG. 24 is a block diagram illustrating an example of a hardware configuration of the relay server 400 according to the embodiment of the present invention. When FIG. 24 is referenced, the relay server 400 includes, for example, an MPU 450, a ROM 452, a RAM 454, a recording medium 456, an input/output interface 458, an operation input device 460, a display device 462, and a communication interface 464. The relay server 400 uses, for example, a bus 466 serving as a data transmission path to connect each constituent element.

The MPU 450 is constituted by an MPU (Micro Processing Unit), an integrated circuit in which a plurality of circuits for achieving control functions are integrated, and the like. The MPU 450 serves as the control unit 406 for controlling the entire relay server 400. In the relay server 400, the MPU 450 serves as a communication control unit 420 and a processing unit 422, which are explained later.

The ROM 452 stores control data such as programs and calculation parameters used by the MPU 450. The RAM 454 primarily stores, for example, programs executed by the MPU 450.

The recording medium 456 serves as the storage unit 404. The recording medium 456 stores, for example, various data such as a browser plug-in transmitted to the information processing apparatus 100, generation control information transmitted from the administration server 500, and applications. Herein, examples of the recording medium 456 include a magnetic recording medium such as a hard disk and a nonvolatile memory such as a flash memory. Alternatively, the relay server 400 may include a recording medium 456 detachably attached to the relay server 400.

The input/output interface 458 is connected to, for example, the operation input device 460 and the display device 462. The operation input device 460 serves as the operation unit 408. On the other hand, the display device 462 serves as the display unit 410. Herein, examples of the input/output interface 458 include a USB terminal, a DVI terminal, an HDMI terminal, and various kinds of processing circuits. The operation input device 460 is arranged in, for example, the relay server 400, and is connected to the input/output interface 458 in the relay server 400. Examples of the operation input device 460 include buttons, arrow keys, a rotation-type selector such as a jog dial, and a combination thereof. The display device 462 is arranged in, for example, the relay server 400, and is connected to the input/output interface 458 in the relay server 400. Examples of the display device 462 include a Liquid Crystal Display and an organic EL display. It is to be understood that the input/output interface 458 can be connected to operation input devices (such as a keyboard and a mouse) serving as an external device of the relay server 400 and a display device (such as an external display). For example, the display device 462 may be a device, such as a touch screen, capable of not only displaying screens but also receiving user operation.

The communication interface 464 is communication means arranged in the relay server 400. The communication interface 464 serves as the communication unit 402 for communicating wirelessly or via a wire with an external apparatus such as the administration server 500 and the information processing apparatus 100 via the networks 800, 900 (or directly). Herein, examples of the communication interface 464 include a LAN terminal and a transmission/reception circuit therefor, an IEEE 802.11g port and a transmission/reception circuit therefor, and a communication antenna and an RF circuit therefor. The communication interface 464 is not limited to the above. For example, the communication interface 464 can have any configuration capable of communicating with the external apparatus via the networks 800, 900.

The relay server 400 uses, for example, the configuration shown in FIG. 24 to relay communication with the information processing apparatus 100 and another server (the administration server 500, the connection information generation server 600, and the data storage server 700). For example, the processing relating to the convenience improving approach according to the embodiment of the present invention as shown in FIG. 2 is performed. It is to be understood that the hardware configuration of the relay server 400 according to the embodiment of the present invention is not limited to the configuration as shown in FIG. 24.

FIG. 23 is referenced again, and constituent elements of the relay server 400 will be explained. The communication unit 402 is communication means of the relay server 400, and the communication unit 402 communicates wirelessly or via a wire with external apparatuses such as the information processing apparatus 100 and the administration server 500 via the networks 800, 900 (or directly). For example, the control unit 406 controls communication of the communication unit 402. Herein, examples of the communication unit 402 include a LAN terminal and a transmission/reception circuit therefor and an IEEE 802.11g port and a transmission/reception circuit therefor.

The storage unit 404 is storage means arranged in the relay server 400. Herein, examples of the storage unit 404 include a magnetic recording medium such as a hard disk and a nonvolatile memory such as a flash memory.

The storage unit 404 stores, for example, various data such as a browser plug-in transmitted to the information processing apparatus 100, generation control information transmitted from the administration server 500, and applications. Herein, FIG. 23 shows an example where a browser plug-in 430 and generation control information 432 are stored in the storage unit 404.

For example, the control unit 406 is constituted by an MPU and an integrated circuit in which various kinds of processing circuits are integrated. The control unit 406 controls the entire relay server 400. Further, the control unit 406 includes the communication control unit 420 and the processing unit 422, and plays a leading role in the processing relating to the convenience improving approach according to the embodiment of the present invention in the relay server 400 as shown in FIG. 2, for example.

The communication control unit 420 controls the communication unit 402, and allows communication between the information processing apparatus 100 and another server (the administration server 500, the connection information generation server 600, and the data storage server 700). The communication control unit 420 controls the communication unit 402, whereby the relay server 400 can relay communication between the information processing apparatus 100 and another server (the administration server 500, the connection information generation server 600, the data storage server 700) as shown in FIG. 2, for example.

The processing unit 422 performs various processing such as generation of various kinds of requests such as a connection information generation request and processing relating to services provided to the information processing apparatus 100.

The control unit 406 includes, for example, the communication control unit 420 and the processing unit 422, and thus plays a leading role in the processing relating to the convenience improving approach according to the embodiment of the present invention in the relay server 400 as shown in FIG. 2, for example. It should be noted that the configuration of the control unit 406 arranged in the relay server 400 according to the embodiment of the present invention is not limited to the example shown in FIG. 23. For example, the relay server 400 according to the embodiment of the present invention may have any configuration capable of achieving the processing relating to the convenience improving approach according to the embodiment of the present invention in the relay server 400 as shown in FIG. 2.

The operation unit 408 is operation means arranged in the relay server 400, which can be operated by an administrator of the relay server 400, for example. Since the relay server 400 has the operation unit 408, the relay server 400 allows an administrator to perform operation and can carry out a processing desired by the administrator according to the operation performed by the administrator. Examples of the operation unit 408 include buttons, arrow keys, a rotation-type selector such as a jog dial, and a combination thereof.

The display unit 410 is display means arranged in the relay server 400, and displays various kinds of information on the display screen. An example of screen displayed on the display screen of the display unit 410 includes an operation screen for causing the relay server 400 to perform a desired operation. Herein, examples of the display unit 410 include an LCD and an organic EL display.

The relay server 400 uses, for example, the configuration shown in FIG. 23 to relay communication with the information processing apparatus 100 and another server (the administration server 500, the connection information generation server 600, and the data storage server 700). For example, the processing relating to the convenience improving approach according to the embodiment of the present invention as shown in FIG. 2 is performed. It is to be understood that the hardware configuration of the relay server 400 according to the embodiment of the present invention is not limited to the configuration as shown in FIG. 23.

[B] Administration Server 500

Figure 25:
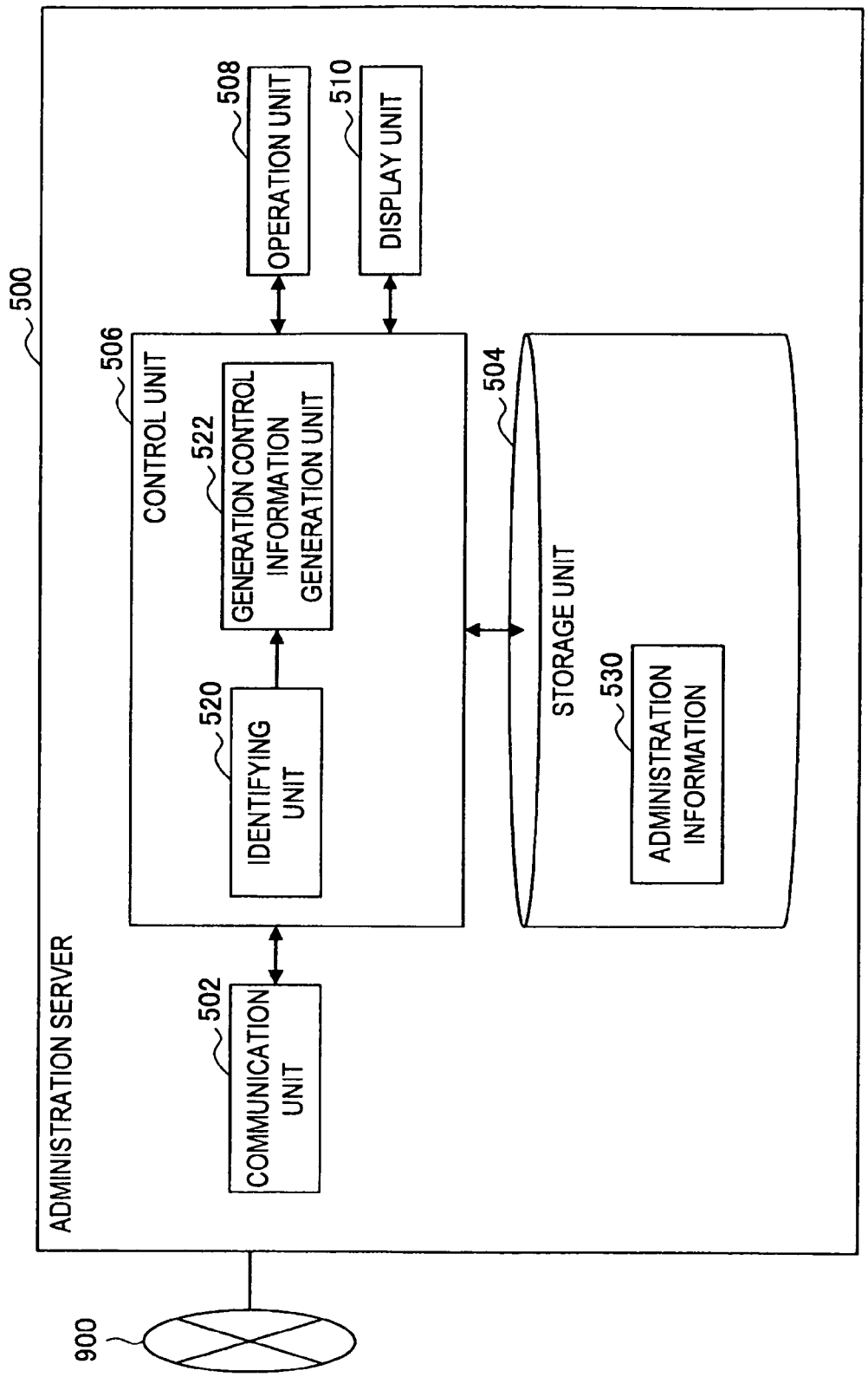
FIG. 25 is a block diagram illustrating an example of a configuration of the administration server according to the embodiment of the present invention.

FIG. 25 is a block diagram illustrating an example of a configuration of the administration server 500 according to the embodiment of the present invention. Herein, in FIG. 25, the network 900 is also shown.

The administration server 500 includes a communication unit 502, a storage unit 504, a control unit 506, an operation unit 508, and a display unit 510.

Further, the administration server 500 may include, for example, a ROM (not shown), a RAM (not shown), and a storage unit (not shown). The administration server 500 uses, for example, a bus serving as a data transmission path to connect each constituent element. Herein, the ROM (not shown) stores control data such as programs and calculation parameters used by the control unit 506. The RAM (not shown) primarily stores programs executed by the control unit 506.

[Hardware Configuration Example of Administration Server 500]

For example, the administration server 500 has a hardware configuration similar to the relay server 400 as shown in FIG. 24. In the administration server 500 having the above configuration, the MPU 450 serves as the control unit 506, and the recording medium 456 serves as the storage unit 504. In the administration server 500 having the above configuration, the operation input device 460 serves as the operation unit 508, and the display device 462 serves as the display unit 510. In the administration server 500 having the above configuration, the communication interface 464 serves as the communication unit 502. It is to be understood that the hardware configuration of the administration server 500 according to the embodiment of the present invention is not limited to the configuration similar to the relay server 400 as shown in FIG. 24.

The communication unit 502 is communication means arranged in the administration server 500, and the communication unit 502 communicates wirelessly or via a wire with external apparatuses such as the relay server 400 via the network 900 (or directly). For example, the control unit 506 controls communication of the communication unit 502. Herein, examples of the communication unit 502 include a LAN terminal and a transmission/reception circuit therefor and an IEEE 802.11g port and a transmission/reception circuit therefor.

The storage unit 504 is storage means arranged in the administration server 500. Herein, examples of the storage unit 504 include a magnetic recording medium such as a hard disk and a nonvolatile memory such as a flash memory.

The storage unit 504 stores, for example, various data such as administration information and applications. Herein, FIG. 25 shows an example where the administration information 530 is stored in the storage unit 504.

For example, the control unit 506 is constituted by an MPU and an integrated circuit in which various kinds of processing circuits are integrated. The control unit 506 controls the entire administration server 500. Further, the control unit 506 includes an identifying unit 520 and a generation control information generation unit 522, and plays a leading role in the processing as shown in FIG. 5 and FIG. 6, for example. In other words, the control unit 506 plays a leading role in the processing relating to the convenience improving approach according to the embodiment of the present invention in the administration server 500 as shown in FIG. 2, for example.

For example, the identifying unit 520 identifies the connection information generation server 600 storing information for generating the connection information corresponding to the connection target apparatus 200 indicated by the apparatus information, based on the apparatus information received by the communication unit 502 and the administration information 530. More specifically, for example, the identifying unit 520 performs the processing of steps S200 to S204 of FIG. 5 to identify the connection information generation server 600 which is caused to generate the connection information.

The generation control information generation unit 522 generates generation control information for causing the connection information generation server 600 identified by the identifying unit 520 to generate the connection information corresponding to the connection target apparatus 200 indicated by the apparatus information. More specifically, for example, the generation control information generation unit 522 performs the processing of step S206 as shown in FIG. 5 (more specifically, for example, the processing as shown in FIG. 6) to generate the generation control information used by the connection information generation server 600 identified by the identifying unit 520 to generate the control information. Then, the generation control information generation unit 522 causes the communication unit 502 to transmit the generated generation control information. For example, the generation control information generation unit 522 may cooperate with a communication control unit (not shown) controlling the communication unit 502 to cause the communication unit 502 to transmit the generated generation control information.

The control unit 506 includes, for example, the identifying unit 520 and the generation control information generation unit 522, and thus plays a leading role in the processing relating to the convenience improving approach according to the embodiment of the present invention in the administration server 500. The configuration of the control unit 506 arranged in the administration server 500 according to the embodiment of the present invention is not limited to the example as shown in FIG. 25. For example, the administration server 500 according to the embodiment of the present invention may have any configuration capable of achieving the processing relating to the convenience improving approach according to the embodiment of the present invention in the administration server 500 as shown in FIG. 2.

The operation unit 508 is operation means possessed by the administration server 500 to enable, for example, an administrator to perform operation. Since the administration server 500 has the operation unit 508, the administration server 500 allows an administrator to perform operation and can carry out a processing desired by the administrator according to the operation performed by the administrator. Examples of the operation unit 508 include buttons, arrow keys, a rotation-type selector such as a jog dial, and a combination thereof.

The display unit 510 is display means arranged in the administration server 500, and displays various kinds of information on the display screen. An example of screen displayed on the display screen of the display unit 510 includes an operation screen for causing the administration server 500 to perform a desired operation. Herein, examples of the display unit 510 include an LCD and an organic EL display.

Since the administration server 500 has, for example, the configuration shown in FIG. 25, the administration server 500 can perform the processing relating to the convenience improving approach according to the embodiment of the present invention in the administration server 500 as shown in FIG. 2. Therefore, the administration server 500 uses, for example, the configuration as shown in FIG. 25 to cause either of one or more connection information generation servers 600 constituting the server 300 to generate the connection information corresponding to the apparatus information transmitted from the information processing apparatus 100. Therefore, with the configuration shown in FIG. 25, the administration server 500 can achieve the information processing system that can improve the convenience of the user when the user starts communication between the information processing apparatus and the connection target apparatus with which the communication is to be performed. It is to be understood that the configuration of the administration server 500 according to the embodiment of the present invention is not limited to the configuration as shown in FIG. 25.

[C] Connection Information Generation Server 600

Figure 26:
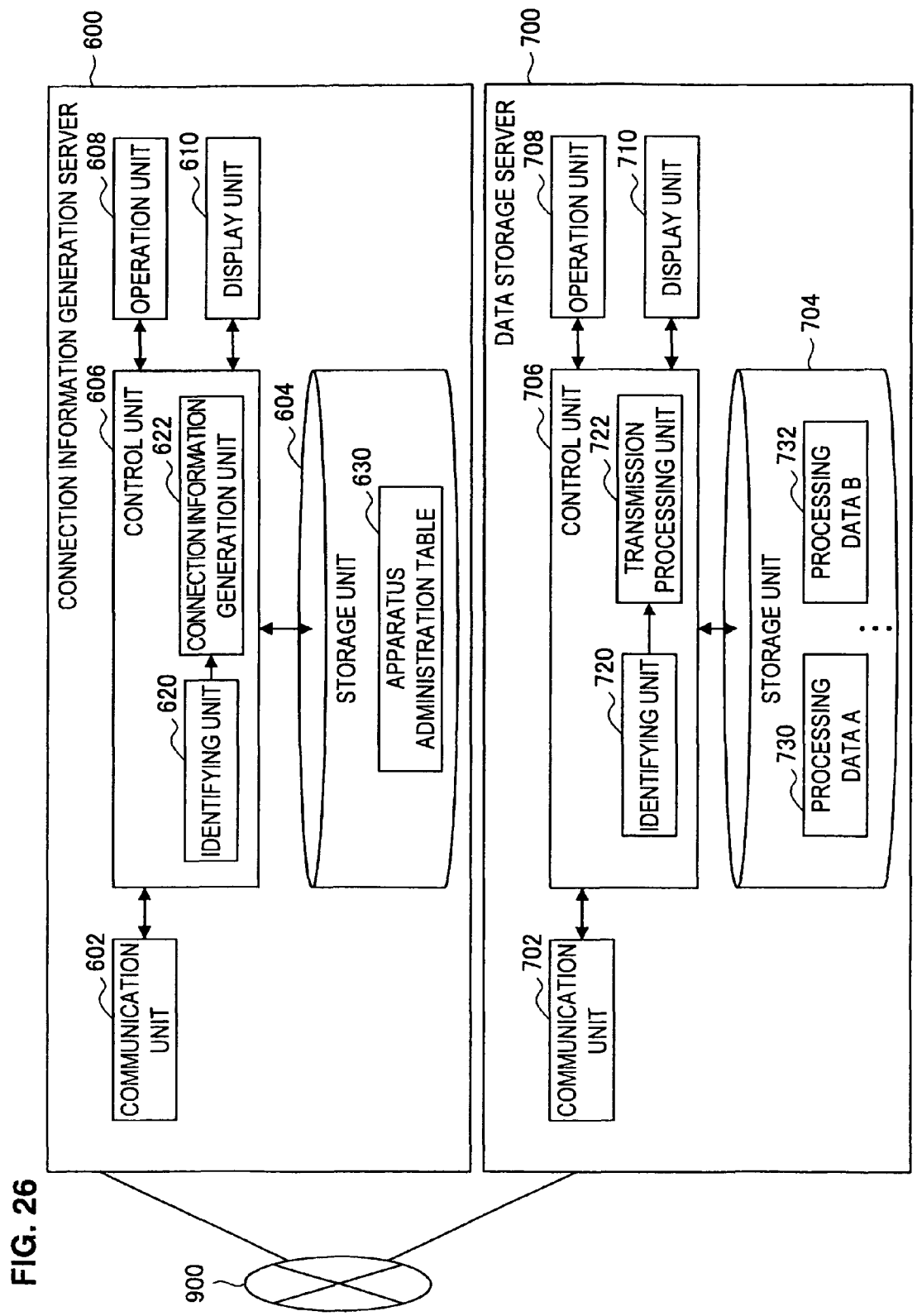
FIG. 26 is a block diagram respectively illustrating an example of a configuration of the administration server according to the embodiment of the present invention and an example of a configuration of the data storage server according to the embodiment of the present invention.

FIG. 26 is a block diagram respectively illustrating an example of a configuration of the connection information generation server 600 according to the embodiment of the present invention and an example of a configuration of the data storage server 700 according to the embodiment of the present invention. Herein, in FIG. 26, the network 900 is also shown.

The connection information generation server 600 includes a communication unit 602, a storage unit 604, a control unit 606, an operation unit 608, and a display unit 610.

Further, the connection information generation server 600 may include, for example, a ROM (not shown), a RAM (not shown), and a storage unit (not shown). The connection information generation server 600 uses, for example, a bus serving as a data transmission path to connect each constituent element. Herein, the ROM (not shown) stores control data such as programs and calculation parameters used by the control unit 606. The RAM (not shown) primarily stores programs executed by the control unit 606.

[Hardware Configuration Example of Connection Information Generation Server 600]

For example, the connection information generation server 600 has a hardware configuration similar to the relay server 400 as shown in FIG. 24. In the connection information generation server 600 having the above configuration, the MPU 450 serves as the control unit 606, and the recording medium 456 serves as the storage unit 604. In the connection information generation server 600 having the above configuration, the operation input device 460 serves as the operation unit 608, and the display device 462 serves as the display unit 610. In the connection information generation server 600 having the above configuration, the communication interface 464 serves as the communication unit 602. It is to be understood that the hardware configuration of the connection information generation server 600 according to the embodiment of the present invention is not limited to the configuration similar to the relay server 400 as shown in FIG. 24.

The communication unit 602 is communication means arranged in the connection information generation server 600, and the communication unit 602 communicates wirelessly or via a wire with external apparatuses such as the relay server 400 via the network 900 (or directly). For example, the control unit 606 controls communication of the communication unit 602. Herein, examples of the communication unit 602 include a LAN terminal and a transmission/reception circuit therefor and an IEEE 802.11g port and a transmission/reception circuit therefor.

The storage unit 604 is storage means arranged in the connection information generation server 600. Herein, examples of the storage unit 604 include a magnetic recording medium such as a hard disk and a nonvolatile memory such as a flash memory.

The storage unit 604 stores, for example, various data such as information for generating the connection information and applications. Herein, FIG. 26 shows an example where the storage unit 604 stores an apparatus administration table 630 storing the information for generating connection information in a table format.

For example, the control unit 606 is constituted by an MPU and an integrated circuit in which various kinds of processing circuits are integrated. The control unit 606 controls the entire connection information generation server 600. Further, the control unit 606 includes an identifying unit 620 and a connection information generation unit 622, and plays a leading role in the processing as shown in FIG. 10 and FIG. 11, for example. In other words, the control unit 606 plays a leading role in the processing relating to the convenience improving approach according to the embodiment of the present invention in the connection information generation server 600 as shown in FIG. 2, for example.

For example, the identifying unit 620 identifies information for generating the connection information used for generation of the connection information, based on the apparatus administration table 630 and the connection information transmission request received by the communication unit 602 (alternatively, the generation control information). More specifically, for example, the identifying unit 620 performs the processing of steps S400 to S406 of FIG. 10 to identify the information for generating the connection information used for generating the connection information.

The connection information generation unit 622 generates connection information based on the information for generating the connection information used for generating the connection information identified by the identifying unit 620. More specifically, for example, the connection information generation unit 622 performs the processing of step S408 as shown in FIG. 10 (more specifically, for example, the processing as shown in FIG. 11) to generate the connection information. Then, the connection information generation unit 622 causes the communication unit 602 to transmit the generated connection information. For example, the connection information generation unit 622 may cooperate with a communication control unit (not shown) controlling the communication unit 602 to cause the communication unit 602 to transmit the generated control information.

The control unit 606 includes, for example, the identifying unit 620 and the connection information generation unit 622, and thus plays a leading role in the processing relating to the convenience improving approach according to the embodiment of the present invention in the connection information generation server 600. It should be understood that the configuration of the control unit 606 arranged in the connection information generation server 600 according to the embodiment of the present invention is not limited to the example as shown in FIG. 26. For example, the connection information generation server 600 according to the embodiment of the present invention may have any configuration capable of achieving the processing relating to the convenience improving approach according to the embodiment of the present invention in the connection information generation server 600 as shown in FIG. 2.

The operation unit 608 is operation means arranged in the connection information generation server 600, which can be operated by an administrator of the connection information generation server 600, for example. Since the connection information generation server 600 has the operation unit 608, the connection information generation server 600 allows an administrator to perform operation and can carry out a processing desired by the administrator according to the operation performed by the administrator. Examples of the operation unit 608 include buttons, arrow keys, a rotation-type selector such as a jog dial, and a combination thereof.

The display unit 610 is display means arranged in the connection information generation server 600, and displays various kinds of information on the display screen. An example of screen displayed on the display screen of the display unit 610 includes an operation screen for causing the connection information generation server 600 to perform a desired operation. Herein, examples of the display unit 610 include an LCD and an organic EL display.

Since the connection information generation server 600 has, for example, the configuration shown in FIG. 26, the connection information generation server 600 can perform the processing relating to the convenience improving approach according to the embodiment of the present invention in the connection information generation server 600 as shown in FIG. 2. Therefore, the connection information generation server 600 uses, for example, the configuration as shown in FIG. 26 to generate the connection information based on the stored information for generating the connection information. Therefore, with the configuration shown in FIG. 26, the connection information generation server 600 can achieve the information processing system that can improve the convenience of the user when the user starts communication between the information processing apparatus and the connection target apparatus with which the communication is to be performed.

It is to be understood that the configuration of the connection information generation server 600 according to the embodiment of the present invention is not limited to the configuration as shown in FIG. 26. For example, the connection information generation server 600 according to the embodiment of the present invention can also generate the connection information by obtaining, as necessary, the information for generating the connection information from an external apparatus storing the information for storing the connection information.

[D] Data Storage Server 700

FIG. 26 is referenced. The data storage server 700 includes a communication unit 702, a storage unit 704, a control unit 706, an operation unit 708, and a display unit 710.

Further, the data storage server 700 may include, for example, a ROM (not shown), a RAM (not shown), and a storage unit (not shown). The data storage server 700 uses, for example, a bus serving as a data transmission path to connect each constituent element. Herein, the ROM (not shown) stores control data such as programs and calculation parameters used by the control unit 706. The RAM (not shown) primarily stores programs executed by the control unit 706.

[Hardware Configuration Example of Data Storage Server 700]

For example, the data storage server 700 has a hardware configuration similar to the relay server 400 as shown in FIG. 24. In the data storage server 700 having the above configuration, the MPU 450 serves as the control unit 706, and the recording medium 456 serves as the storage unit 704. In the data storage server 700 having the above configuration, the operation input device 460 serves as the operation unit 708, and the display device 462 serves as the display unit 710. In the data storage server 700 having the above configuration, the communication interface 464 serves as the communication unit 702. It is to be understood that the hardware configuration of the data storage server 700 according to the embodiment of the present invention is not limited to the configuration similar to the relay server 400 as shown in FIG. 24.

The communication unit 702 is communication means arranged in the data storage server 700, and the communication unit 702 communicates wirelessly or via a wire with external apparatuses such as the relay server 400 via the network 900 (or directly). For example, the control unit 706 controls communication of the communication unit 702. Herein, examples of the communication unit 702 include a LAN terminal and a transmission/reception circuit therefor and an IEEE 802.11g port and a transmission/reception circuit therefor.

The storage unit 704 is storage means arranged in the data storage server 700. Herein, examples of the storage unit 704 include a magnetic recording medium such as a hard disk and a nonvolatile memory such as a flash memory.

The storage unit 704 stores, for example, various data such as processing data and applications. Herein, FIG. 26 shows an example where processing data A 730, processing data B 732, . . . are stored in the storage unit 704.

For example, the control unit 706 is constituted by an MPU and an integrated circuit in which various kinds of processing circuits are integrated. The control unit 706 controls the entire data storage server 700. Further, the control unit 706 includes an identifying unit 720 and a transmission processing unit 722, and plays a leading role in the processing relating to the convenience improving approach according to the embodiment of the present invention in the data storage server 700 as shown in FIG. 2, for example.

For example, the identifying unit 720 identifies processing data corresponding to a data transmission request from among processing data stored in the storage unit 704, based on the data transmission request received by the communication unit 702. More specifically, for example, the identifying unit 620 performs the processing of steps S600 to S606 of FIG. 14 to identify the processing data corresponding to the data transmission request.

The transmission processing unit 722 causes the communication unit 702 to transmit the processing data identified by the identifying unit 720. Further, for example, the transmission processing unit 722 may also serve as a communication control unit for controlling the communication unit 602.

The control unit 706 includes, for example, the identifying unit 720 and the transmission processing unit 722, and thus plays a leading role in the processing relating to the convenience improving approach according to the embodiment of the present invention in the data storage server 700 in FIG. 2, for example. It should be understood that the configuration of the control unit 706 arranged in the data storage server 700 according to the embodiment of the present invention is not limited to the example as shown in FIG. 26. For example, the data storage server 700 according to the embodiment of the present invention may have any configuration capable of achieving the processing relating to the convenience improving approach according to the embodiment of the present invention in the data storage server 700 as shown in FIG. 2.

The operation unit 708 is operation means arranged in the data storage server 70, which can be operated by an administrator of the data storage server 700, for example. Since the data storage server 700 has the operation unit 708, the data storage server 700 allows an administrator to perform operation and can carry out a processing desired by the administrator according to the operation performed by the administrator. Examples of the operation unit 708 include buttons, arrow keys, a rotation-type selector such as a jog dial, and a combination thereof.

The display unit 710 is display means arranged in the data storage server 700, and displays various kinds of information on the display screen. An example of screen displayed on the display screen of the display unit 710 includes an operation screen for causing the data storage server 700 to perform a desired operation. Herein, examples of the display unit 710 include an LCD and an organic EL display.

Since the data storage server 700 has, for example, the configuration shown in FIG. 26, the data storage server 700 can perform the processing relating to the convenience improving approach according to the embodiment of the present invention in the data storage server 700 as shown in FIG. 2. It is to be understood that the configuration of the data storage server 700 according to the embodiment of the present invention is not limited to the configuration as shown in FIG. 26.

For example, the server 300 according to the embodiment of the present invention is constituted by the server set including the relay server 400, the administration server 500, the connection information generation server 600, and the data storage server 700, as described above. Therefore, the server 300 according to the embodiment of the present invention can achieve the processing relating to convenience improving approach according to the embodiment of the present invention in the server 300 as shown in FIG. 2, for example. It is to be understood that the server 300 according to the embodiment of the present invention is not limited to the configuration constituted by the server set as described above. For example, the server 300 according to the embodiment of the present invention may be constituted by one server having the functions of the relay server 400, the administration server 500, the connection information generation server 600, and the data storage server 700.

As described above, the information processing system 1000 according to the embodiment of the present invention includes, for example, the information processing apparatus 100, and one or more connection target apparatuses 200, and the server 300. In the information processing system 1000, the information processing apparatus 100 communicates with the server 300 via the second communication path, which is different from the first communication path, in order to perform communication between the information processing apparatus 100 and the connection target apparatus 200 via the first communication path. The server 300 generates connection information corresponding to the connection target apparatus 200 with which the information processing apparatus 100 wants to communicate via the first communication path, based on the communication with the information processing apparatus 100, and transmits the generated connection information to the information processing apparatus 100. Then, the information processing apparatus 100 uses the connection information transmitted from the server 300 to start communication with the connection target apparatus 200 corresponding to the connection information via the first communication path. As described above, in the information processing system 1000, the user does not have to bring the information processing apparatus 100 and the connection target apparatus 200 into proximity to each other, as in the conventional technique, in order to start communication between the information processing apparatus 100 and the connection target apparatus 200 via the first communication path.

Therefore, in the information processing system 1000, the convenience of the user can be improved when the user starts communication between the information processing apparatus 100 and the connection target apparatus 200 with which communication is to be performed.

Further, in the information processing system 1000, the information processing apparatus 100 uses the communication information obtained from the server 300 to start communication via the first communication path as described above. Therefore, communication can be started via the first communication path without bringing the information processing apparatus 100 and the connection target apparatus 200 into proximity to each other. Therefore, for example, even when the information processing apparatus 100 and the communication target apparatus 200 are not mobile apparatuses such as portable telephones (for example, fixed apparatuses), communication can be started via the first communication path without imposing any burden on the user as in the conventional technique. Therefore, the information processing system 1000 can improve the convenience of the user than the conventional technique.

Even in a case where both of the information processing apparatus 100 and the communication target apparatus 200 do not have any communication device for communication by means of NFC as in the conventional technique, communication can be started via the first communication path in the information processing system 1000. Therefore, in the information processing system 1000, each of the information processing apparatus 100 and the communication target apparatus 200 does not need to have a communication device for communicating by means of NFC. As a result, the hardware cost of the communication device of each of the information processing apparatus 100 and the communication target apparatus 200 is eliminated.

Recently, not only computers such as a PC and portable communication apparatuses such as a portable telephone but also various apparatuses having network connection functions such as a television receiver have come on the market. Moreover, a type of a system (a form of use of service) called cloud computing, which is provided on the assumption of a network connection, attracts a lot of attention, and various kinds of apparatuses having network connection functions are expected to increase more than ever. Herein, as described above, the information processing system 1000 uses the connection information obtained from the server 300 connected via the network and the like, and starts communication with the connection target apparatus 200 corresponding to the connection information via the first communication path. Therefore, the information processing system 1000 is highly compatible with the system, such as cloud computing, provided on the assumption of network connection. This means that the information processing system 1000 is highly versatile information processing apparatus.

The information processing apparatus 100 has been hereinabove explained as a constituent element constituting the information processing system 1000 according to the embodiment of the present invention. However, the embodiment of the present invention is not limited to such configuration. The embodiment of the present invention can be applied to various apparatuses, for example, computers such as a PC and a PDA (Personal Digital Assistant), portable communication apparatuses such as a portable telephone and a PHS (Personal Handyphone System), audio/video reproduction apparatuses, audio/video recording/reproduction apparatuses, and game machines.

The communication target apparatus 200 has been hereinabove explained as a constituent element constituting the information processing system 1000 according to the embodiment of the present invention. However, the embodiment of the present invention is not limited to such configuration. The embodiment of the present invention can be applied to various apparatuses, for example, computers such as a PC and a PDA (Personal Digital Assistant), portable communication apparatuses such as a portable telephone and a PHS (Personal Handyphone System), audio/video reproduction apparatuses, audio/video recording/reproduction apparatuses, game machines, and healthcare apparatuses such as a weighting machine and a blood pressure monitor.

The server 300, the relay server 400, the administration server 500, the connection information generation server 600, and the data storage server 700 have been hereinabove explained as constituent elements constituting the information processing system 1000 according to the embodiment of the present invention. However, the embodiment of the present invention is not limited to such configuration. The embodiment of the present invention can be applied to various apparatuses, for example, computers such as a PC and a server.

(Program According to an Embodiment of the Present Invention)

[Program Relating to Information Processing Apparatus 100]

With a program for causing a computer to function as the information processing apparatus according to the embodiment of the present invention, communication can be performed via the first communication path with one or more connection target apparatuses 200 corresponding to the connection information, on the basis of the connection information obtained from the server 300 via the second communication path. Therefore, with the use of the program for causing the computer to function as the information processing apparatus according to the embodiment of the present invention, the information processing system is achieved that can improve the convenience of the user when the user starts communication between the information processing apparatus and the connection target apparatus with which the communication is to be performed.

[Program Relating to Server 300]

With a program for causing a computer to function as the server according to the embodiment of the present invention, the connection information can be generated based on the communication with the information processing apparatus 100, wherein the connection information corresponds to the connection target apparatus 200 with which the information processing apparatus 100 wants to communicate via the first communication path. Then, the generated connection information can be transmitted to the information processing apparatus 100. Therefore, with the use of the program for causing a computer to function as the server according to the embodiment of the present invention, the information processing system is achieved that can improve the convenience of the user when the user starts communication between the information processing apparatus and the connection target apparatus with which the communication is to be performed.

In the embodiment of the present invention, programs can be provided to cause a computer to function as the relay server 400, the administration server 500, the connection information generation server 600, and the data storage server 700 according to the embodiment of the present invention.

It should be understood by those skilled in the art that various modifications, combinations, sub-combinations and alterations may occur depending on design requirements and other factors insofar as they are within the scope of the appended claims or the equivalents thereof.

For example, the information processing apparatus according to the embodiment of the present invention may individually have the connection target detection unit 120 and the communication control unit 122 as shown in FIG. 19 (for example, each of the connection target detection unit 120 and the communication control unit 122 may be achieved with an individual processing circuit). Likewise, each of the relay server 400, the administration server 500, the connection information generation server 600, and the data storage server 700 according to the embodiment of the present invention may individually have the constituent elements constituting each control unit as shown in FIGS. 23, 25, and 26.

In the above explanation, the programs (computer programs) are provided to cause a computer to function as the information processing apparatus and the server according to the embodiment of the present invention. Further, in the embodiment of the present invention, a recording medium storing the programs can also be provided.

It should be appreciated that the arrangements described above only represent exemplary embodiments of the present invention, and that the arrangements are embraced in the technical scope of the present invention.

The invention claimed is:

1. An information processing apparatus, comprising:
a control unit configured to:
detect a connection target apparatus via a first communication path from a first network other than a third communication path from a third network on which communication is to be performed between the connection target apparatus and the information processing apparatus associated with the control unit,
wherein the first network is different from the third network,
generate apparatus information associated with the connection target apparatus based on a signal received from the connection target apparatus over the first communication path in response to a detection signal to detect the connection target apparatus,
transmit the apparatus information to a server via a second communication path from a second network, wherein the second network is different from the first and third networks,
receive connection information from the server through the second communication path, the connection information including connection information for connecting the connection target apparatus via the third communication path with the information processing apparatus associated with the control unit, and
initiate communication with the connection target apparatus via the third communication path based on the received connection information,
wherein the connection information is generated based on a comparison result of the apparatus information and administration information stored in the server for generating the connection information, and
wherein the connection information is generated based on generation control information that is generated by attaching a parameter corresponding to the apparatus information to a URL (uniform resource locator) indicating the server.

2. The information processing apparatus as recited in claim 1, wherein the first network is a near field communication network.

3. An information processing system, comprising:
at least one information processing apparatus configured to detect a connection target apparatus via a first communication path from a first network, generate apparatus information associated with the connection target apparatus based on a signal received from the connection target apparatus over the first communication path in response to a detection signal from the at least one information processing apparatus to detect the connection target apparatus, and transmit the apparatus information via a second communication path from a second network, wherein the first network is different from the second network; and
at least one server configured to receive the apparatus information from the information processing apparatus via the second communication path, generate connection information based on the apparatus information, and transmit the connection information to the information processing apparatus via the second communication path, and
wherein the connection information comprises information for connecting the information processing apparatus and the connection target apparatus over a third communication path from a third network on which communication is to be performed between the connection target apparatus and the information processing apparatus, wherein the third network is different from the first and second networks, wherein the connection information is generated based on a comparison result of the apparatus information and administration information stored in the at least one server for generating the connection information, and wherein the connection information is generated based on generation control information that is generated by attaching a parameter corresponding to the apparatus information to a URL (uniform resource locator) indicating the server.

4. The information processing system as recited in claim 3, wherein the first network is a near field communication network.

5. The information processing system as recited in claim 3, wherein the at least one server comprises at least one administration server configured to receive the apparatus information, generate generation control information based on the apparatus information, and transmit the connection information to the information processing apparatus.

6. The information processing system as recited in claim 5, further comprising at least one relay server configured to relay information between the information processing apparatus and the administration server.

7. The information processing system as recited in claim 6, further comprising at least one connection information generation server configured to generate control information in response to a request from the relay server.

8. The information processing system as recited in claim 6, further comprising at least one connection information generation server configured to generate the control information in response to a request from the administration server.

9. The information processing system as recited in claim 3, wherein if the information processing apparatus determines that the connection information is insufficient for starting communication with the connection target apparatus, the information processing apparatus is configured to transmit to the at least one server a data transmission request.

10. The information processing system as recited in claim 9, wherein the at least one server is configured to respond to the data transmission request by transmitting processing data to the information processing apparatus, and the information processing apparatus is configured to use the processing data to establish communication with the connection target apparatus over the third communication path.

11. An information processing method, comprising:
detecting, from a signal received in response to a detection signal via a first communication path from a first network to detect a connection target apparatus, the connection target apparatus at an information processing apparatus, wherein the first communication path is other than a third communication path from a third network on which communication is to be performed between the connection target apparatus and the information processing apparatus, wherein the first network is different from the third network;

generating apparatus information associated with the connection target apparatus based on the signal received therefrom during detection of the connection target apparatus;

transmitting the apparatus information to a server through a second communication path from a second network, wherein the second network is different from the first and third networks;

receiving connection information, the connection information including information used to connect the connection target apparatus to the third communication network, from the server at the information processing apparatus via the second communication path; and initiating communication with the connection target apparatus via the third communication path based on the received connection information, wherein the connection information is generated based on a comparison result of the apparatus information and administration information stored in the server for generating the connection information, and wherein the connection information is generated based on generation control information that is generated by attaching a parameter corresponding to the apparatus information to a URL (uniform resource locator) indicating the server.

12. The information processing method as recited in claim 11, wherein the first network is a near field communication network.

13. An information processing method, comprising:
detecting, from a signal received in response to a detection signal via a first communication path from a first network to detect a connection target apparatus, the connection target apparatus at an information processing apparatus, wherein the first communication path is other than a third communication path from a third network on which communication is to be performed between the connection target apparatus and the information processing apparatus wherein the first network is different from the third network;

generating, at the information processing apparatus, apparatus information associated with the connection target apparatus based on the signal received therefrom during detection of the connection target apparatus;

transmitting the apparatus information from the information processing apparatus to a server via a second communication path from a second network, wherein the second network is different from the first and third networks;

receiving the transmitted apparatus information at the server;

generating connection information, at the server, for connecting the target connection device to the third communication path based on the received apparatus information; and transmitting the connection information from the server to the information processing apparatus via the second communication path, wherein the connection information is generated based on a comparison result of the apparatus information and administration information stored in the server for generating the connection information, and wherein the connection information is generated based on generation control information that is generated by attaching a parameter corresponding to the apparatus information to a URL (uniform resource locator) indicating the server.

14. The information processing method as recited in claim 13, further comprising initiating communication between the information processing apparatus and the connection target apparatus via the third communication path based on the connection information.

15. The information processing method as recited in claim 13, wherein the first network is a near field communication network.

* * * * *